US010043409B1

(12) United States Patent
Nash et al.

(10) Patent No.: US 10,043,409 B1
(45) Date of Patent: Aug. 7, 2018

(54) SYSTEMS AND METHODS FOR MONITORING COMPREHENSION

(71) Applicant: Comprendio, Inc., Honolulu, HI (US)

(72) Inventors: Daniel Elwin Walter Nash, Honolulu, HI (US); Sean Michael Ho'Okano-Briel, Honolulu, HI (US)

(73) Assignee: COMPRENDIO, INC., Honolulu, HI (US)

( * ) Notice: Subject to any disclaimer, the term of this patent is extended or adjusted under 35 U.S.C. 154(b) by 252 days.

(21) Appl. No.: 15/003,763

(22) Filed: Jan. 21, 2016

Related U.S. Application Data

(60) Provisional application No. 62/106,135, filed on Jan. 21, 2015.

(51) Int. Cl.
*G09B 7/02* (2006.01)
*G09B 5/02* (2006.01)

(52) U.S. Cl.
CPC ............... *G09B 7/02* (2013.01); *G09B 5/02* (2013.01)

(58) Field of Classification Search
CPC .................................. G09B 5/02; G09B 7/02
See application file for complete search history.

(56) References Cited

U.S. PATENT DOCUMENTS

| | | | | |
|---|---|---|---|---|
| 6,144,838 A * | 11/2000 | Sheehan | ................... | G09B 7/02 434/118 |
| 9,418,174 B1 * | 8/2016 | Gan | ......................... | G06N 5/02 |
| 2006/0070005 A1 * | 3/2006 | Gilbert | .................. | G06F 17/243 715/763 |
| 2007/0172809 A1 * | 7/2007 | Gupta | ...................... | G09B 3/00 434/350 |
| 2008/0232690 A1 * | 9/2008 | Saund | ................. | G06F 3/04883 382/187 |
| 2009/0196505 A1 * | 8/2009 | Sullender | ............. | G06K 9/4638 382/180 |

OTHER PUBLICATIONS

"Tree Diagram for conditional probability 2", Jul. 31, 2010, at https://www.youtube.com/watch?v=IO_9ArLDM_k, (last viewed Nov. 28, 2017).*

* cited by examiner

*Primary Examiner* — Steve Rowland
(74) *Attorney, Agent, or Firm* — Wilson Sonsini Goodrich & Rosati

(57) ABSTRACT

Provided herein are systems and methods for characterizing a perception of one or more concepts by one or more learners. The concepts can be presented to the one or more learners by one or more trainers. The learners can be provided with a map of key ideas in a concept. The map can identify key ideas and relationships between the key ideas to aid the learner in organizing one or more thoughts of the learner. The learner can take notes on the map in the form of a textual input. The textual input can be analyzed and compared to a list of metadata tags that were entered and stored in the map by the architect. The text analysis can be provided to the trainer in real time to indicate a level of understanding or characterization of perception of the learner.

19 Claims, 26 Drawing Sheets

FIG. 10

Schemas Shared with Me — View All >

| Southpark | | |
|---|---|---|
| Last Updated 5/12/14 | | |
| Node Keywords | Connection Keywords | My Accuracy |
| 7/30 | 71/80 | 64% |
| Work on Schema | | |

| Save the Game | | |
|---|---|---|
| Last Updated 5/12/14 | | |
| Node Keywords | Connection Keywords | My Accuracy |
| 9/30 | 29/30 | 68% |
| Work on Schema | | |  ← 1001

Add Scheme ID — Add

| Southpark | | |
|---|---|---|
| Last Updated 5/12/14 | | |
| Node Keywords | Connection Keywords | My Accuracy |
| 0/30 | 0/80 | 0% |
| Work on Schema | | |

View All >

° Number — °Expressions — ° Operations
°Expressions — ° Equation

| Number | | | |
|---|---|---|---|
| Description | | | |
| Take the time to review the video in the first reference link. Make at least 5 observations. Once done attempt the google doc collaboration. Reflect with the guiding questions once you are done. | | | |
| # | Reference | Guiding Questions | Keywords |
| | Add... | Add... | Add... |
| 1 | Khan Academy+ / Paste a link / Open in: Current Window | What are the five key components needed to solve the problem in the video? | expression+ / no change+ / represent+ |
| | Add View Remove | | |
| 2 | Add... | Add... | Add... |
| 3 | Add... | | |

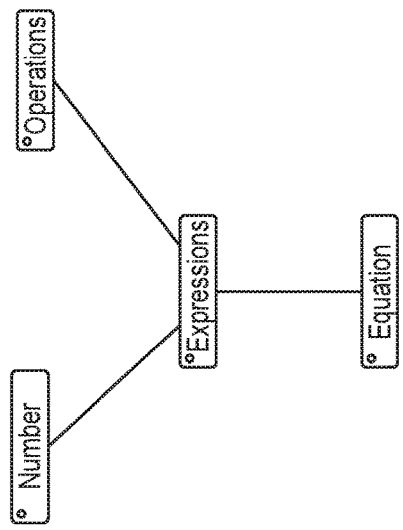
FIG. 15

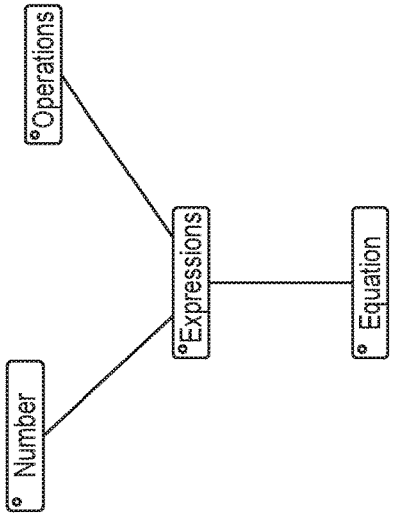

| Number | |
|---|---|
| Description | Guiding Questions ⚙ |
| Take the time to review the video in the first reference link. Make at least 5 observations. Once done attempt the google doc collaboration. Reflect with the guiding questions once you are done. | 1. What are the five key components needed to solve the problem in the video. |
| Reference | Keywords |
| 1. Khan Academy | 1. (expression (3)) (no change) (represent) |

Math Demo for Learning
Autosaved Dec 10, 10:26 pm

✎ Keywords: 1/3 ⚙

Overall: 16/24 ▮▮▮▮▯▯▯ ← Feedback

Number

| Description | Guiding Questions |
|---|---|
| Take the time to review the video in the first reference link. Make at least 5 observations. Once done attempt the google doc collaboration. Reflect with the guiding questions once you are done. | 1. What are the five key components needed to solve the problem in the video? ← 2304<br><br>2. What did you notice about the activity in the google doc? |
| Reference | Observations |
| 1. Khan Academy<br>2. Google Doc Group Activity<br>3. Quiz<br>4. Group Discussion Thread | I noticed that in the video their was an importance for understanding that their was no change in the statement ← 2302 |

° Number — ° Expressions — ° Operations
                    |
                 ° Equation

FIG. 23

Number

| Description | Guiding Questions |
|---|---|
| Take the time to review the video in the first reference link. Make at least 5 observations. Once done attempt the google doc collaboration. Reflect with the guiding questions once you are done. | 1. What are the five key components needed to solve the problem in the video?<br><br>2. What did you notice about the activity in the google doc? |

| Reference | Observations |
|---|---|
| 1. Khan Academy<br>2. Google Doc Group Activity<br>3. Quiz<br>4. Group Discussion Thread | I noticed that in the video their was an importance for understanding that their was no change in the statement. |

SYNONYM

You are on the right track! You identified a synonym related to of one of the keywords you need to observe for Guiding Question 1.

( Open Related Reference )  ( Move on )

— 2402

2404 —

Math Demo for Learning
Autosaved Dec 10, 10:26 pm

Keywords: 1/3

Overall: 16/24

° Number — ° Expressions — ° Operations
                    |
                ° Equation

FIG. 24

⊗ Math Demo for Learning
Autosaved Dec 10, 10:26 pm

∅ Keywords: 2/3   ⚙

Overall: 16/24 ▮▮▮▮▯▯▯▯▯▯   ▮▮▯▯▯▯▯▯▯▯ Feedback

Number

| Description | Guiding Questions |
|---|---|
| Take the time to review the video in the first reference link. Make at least 5 observations. Once done attempt the google doc collaboration. Reflect with the guiding questions once you are done. | 1. What are the five key components needed to solve the problem in the video?  ← 2502<br><br>2. What did you notice about the activity in the google doc? |
| Reference | Observations |
| 1. Khan Academy<br>2. Google Doc Group Activity<br>3. Quiz<br>4. Group Discussion Thread | I noticed that in the video their was an importance for understanding that their was no change in the statement.<br><br>The video called it an expression because it modeled the amount. |

```
      ° Number  ———  ° Expressions  ———  ° Operations
                          |
                      ° Equation
```

FIG. 25

Overall: 16/24 ▭▭▭ ⬜ (Feedback)

Math Demo for Learning
Autosaved Dec 10, 10:26 pm

Number

⬢ Keywords: 2/3 ⚙

| Description | Guiding Questions |
|---|---|
| Take the time to review the video in the first reference link. Make at least 5 observations. Once done attempt the google doc collaboration. Reflect with the guiding questions once you are done. | 1. What are the five key components needed to solve the problem in the video?<br><br>2. What did you notice about the activity in the google doc? |

Progress

Almost there. You got 1 more keyword you need to observe to be aligned with this question.

(Open Related Reference) (Move on)

The video called it an expression because it modeled the amount.

Reference

1. Khan Academy
2. Google Doc
3. Quiz
4. Group Discussion Thread

○ Number
○ Expressions
  ○ Equation
○ Operations

SYSTEMS AND METHODS FOR MONITORING COMPREHENSION

CROSS-REFERENCE

This application claims priority to U.S. Provisional Application Ser. No. 62/106,135, filed on Jan. 21, 2015, which application is incorporated herein by reference.

BACKGROUND

In a teaching environment, a teacher can provide a lesson to one or more students. However, the teacher can be unaware of the thoughts of the students during the lesson. In some cases, the students can fail to comprehend important key concepts or relationships between two or more key concepts provided in the lesson. The teacher can be unaware of the comprehension failure until an assessment occurs days, weeks, or months after the lesson was provided if at all.

SUMMARY

Provided herein are systems and methods for monitoring and providing feedback to a trainer about a learner's thoughts, perceptions, and/or comprehension in real time. Such methods and systems are based at least in part on the realization that providing indications of comprehension failures in real time during a lesson can enhance the effectiveness of a lesson. A concept map (e.g., mental model) can be provided to the learner. The concept map can have metadata associated with one or more concepts on the map, the metadata can be provided by an architect. The metadata can be hidden from the learner viewing the map. The learner can take notes on the map and the notes can be analyzed to identify matches with metadata concepts. The trainer can be provided with an alignment score indicating how many of the metadata concepts the learner has matched. The alignment score can indicate a level of understanding of the learner.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "figure" and "FIG." herein), of which:

FIG. 10 show a home page that can be viewed by a learner in a user interface to summarize maps in use by the learner;

FIGS. 13 and 14 show a user interface that can be provided to an architect to enter various information to build the concept of FIG. 12;

FIG. 15 shows exemplary information relating to the concept of FIGS. 12 and 13;

FIGS. 16, 17, and 18 show the addition of synonyms associated with a particular keyword in FIG. 15;

FIG. 21 shows a user interface that that can be provided to a learner to enter observations about a concept;

FIGS. 23, 24, 25, and 26 illustrate hints that may be provided to aid a learner in mastering a concept.

DETAILED DESCRIPTION

Figure 1:
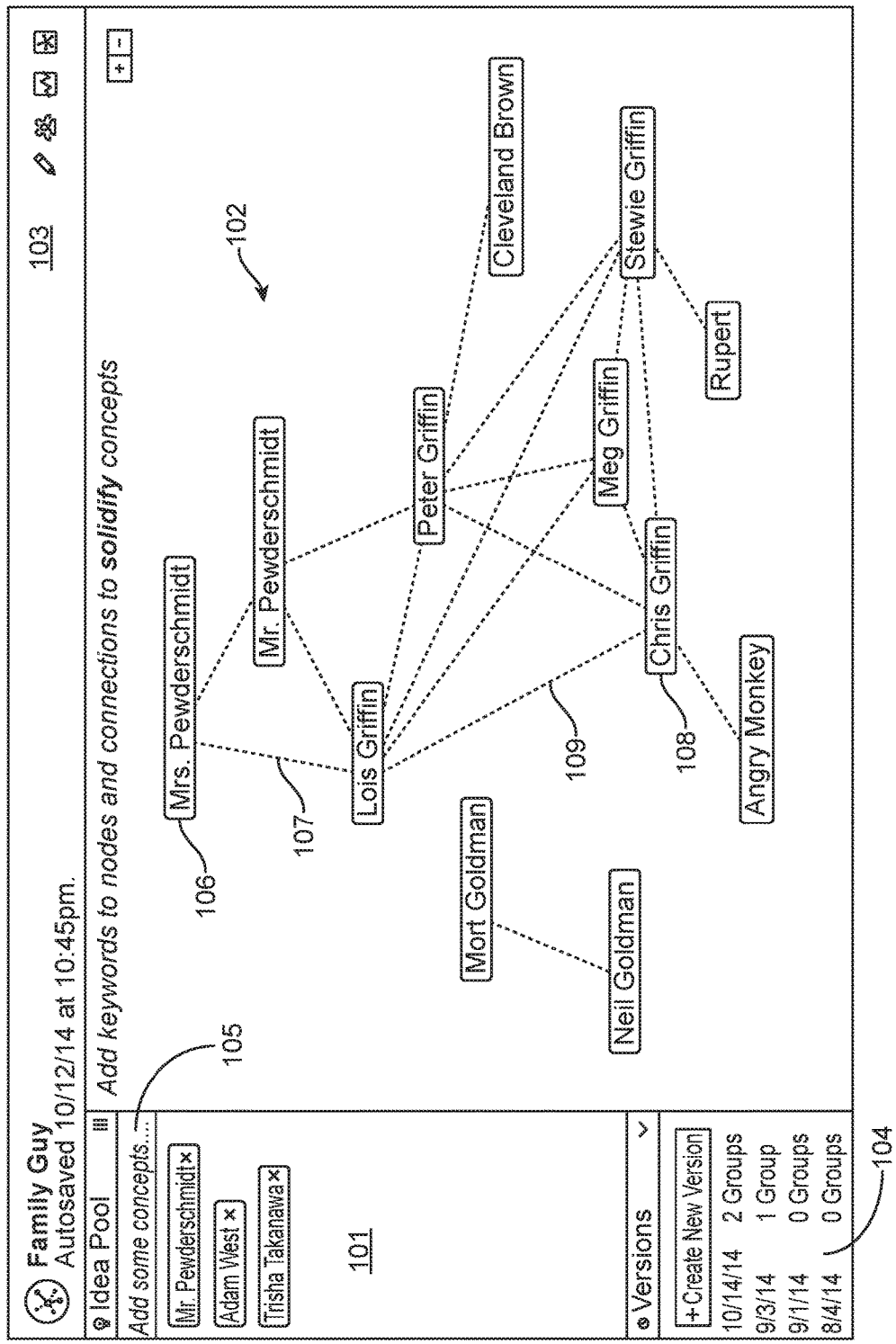
FIG. 1 shows a flow diagram of a series of views that can be provided to an architect in a user interface to build the map from a blank map canvas.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

The term "map", as used herein, generally refers to a visual representation or depiction of concepts and connections between concepts. Each concept can be displayed in the map with a block (e.g., node). Two or more concepts can have a relationship represented by one or more line segments (e.g., node connection). The relationship can be a categorical relationship, a direct relationship, an inverse relationship, or any other relationship that connects the two or more concepts.

The term "architect", as used herein, generally refers to a person that provides metadata tags for one or more nodes and/or node connections. The architect can be an expert in a field of the concepts represented in the map. The architect can be a manager of a group of people. The architect can be a trainer. The architect can be one person or more than one person.

The term "learner", as used herein, generally refers to a person that interacts with a map to fill in notes during a lesson. The learner can be a student, a trainee, a interviewee, or any other individual whose perception of concepts is analyzed and/or monitored.

The term "trainer", as used herein, generally refers to a person that provides a lesson to one or more learners. The trainer can be a teacher, guide, lecturer, presenter, speaker, or any other individual that provides information to a group of learners. The trainer can receive feedback on the analysis of the perception of concepts of the one or more learners in real time. In some cases, the trainer and the architect can be the same person. In some embodiments the trainer can be a non-human entity. The trainer can be a computer system. The trainer can be a computer system operating an artificial intelligence learning algorithm.

The term "lesson", as used herein, generally refers to a presentation that provides information to one or more learners. The lesson can be a live or recorded presentation. The lesson can be a video and/or audio recording. The lesson can be a lecture, presentation, conversation, and/or seminar. The lesson can be provided by one or more speakers. The lesson can comprise an interactive learning experience. The lesson can comprise a hands-on learning experience. The lesson can comprise role-playing. The lesson can comprise an activity performed by one or more learners.

Identifying and/or characterizing perception of concepts can be achieved by analysis of notes during a lesson. Analysis of the notes can identify gaps in learning. In some cases, analysis of the notes can identify differences in experiential background, thinking processes, educational background, topical background, attitude, and/or problem solving approaches between two or more individuals. Provided herein are systems and methods for providing an analysis to identify and/or characterized perception of concepts in real time during a lesson. The analysis can be provided to a trainer through a graphical user interface on an electronic device. The perception of concepts can be determined in real time without providing a specific question to a learner. The perception of concepts can be determined from notes taken by the learner, in some cases, the notes can be taken in a graphical user interface. The notes can pertain to specific concepts and relationships between a first concept and a second concept. The concepts represented by the nodes and relationships between concepts represented by node connections can be provided to the learner in a map to aid the learner in organizing information.

Identifying and/or characterizing perception of concepts can be achieved by analysis of notes during a lesson with a computer system. The computer system can comprise memory storage units in communication with one or more computer processors. The memory storage units can comprise stored information that can be read by the one or more processors to generate a map on a screen to provide an editable user interface to an architect, learner, and/or trainer. The user interface can be accessed through a login window. An architect, learner, and/or trainer can have a unique login. The user interface display and functionality on an electronic display can be different for an architect, learner, and/or trainer. The user interface can be provided on a screen. The screen can be a screen on a monitor, smartphone, tablet, projector, or other electronic device. The screen can be a touch screen (e.g., resistive or capacitive touch screen).

FIG. 1 shows a flow chart of a series of user interfaces within which an architect can work in to prepare a map. In a first step 101 the architect can enter one or more words that can populate a word bank to supply nodes to a map. Each entered word or phrase can be shown in a block 102. The architect can enter as many words or phrases into the word bank as they need to build the map. After the architect starts building the map they can return to the interface shown in 101 to add one or more words and/or phrases to the word bank. After the architect starts building the map they can return to the interface shown in 101 to remove one or more words and/or phrases from the word bank.

In a next step 103 the architect can be provided with a user interface with a view of a map building canvas 104. The interface can comprise a word bank 105, a map building canvas 104, a tool bar, and an information panel. The information panel can show groups of learners with which the map is currently shared. In some cases the word bank can comprise a list of one or more words and/or phrases. The word bank can comprise words and/or phrases that were previously entered by the architect. The one or more words and/or phrases can be selected from a group of frequently and/or recently used words and/or phrases. The architect can add words and/or phrases to the word bank by typing in a text box 106 provided in the interface. The architect can remove one or more words and/or phrases from the word bank. In some cases, the architect can add or remove words to the word bank by returning to the screen shown in 101.

The architect can generate a map in the map building canvas 104 with the words and/or phrases. In some cases the architect and "drag and drop" words and/or phrases from the word bank into the map building area to generate a map. The architect can put words that have a conceptual connection in close proximity to each other on the map. In some cases, an architect can show hierarchy in one or more concepts by orienting one or more nodes in a linear formation on the map.

In a third interface view 107 the architect can connect one or more nodes in the map with one or more line segments (e.g., node connections). A map can comprise one or more connected nodes 108. A node can be a word or phrase, in some cases, the word or phrase can be displayed in the map in a shape (e.g., square, circle, oval). A node can be representative of a keyword or concept. Each node can be connected to one or more other nodes. A connection between two or more nodes can represent a conceptual link. For example a node for "apple" can be connected to a node for "fruit" indicating that an apple is a type of fruit. In some cases, a connection can be shown with one or more line segments 109.

The map generated by the architect can organize concepts to show hierarchy, relationships, and/or coupling between different ideas and/or concepts. The map can be provided to a learner to help the learner organize key concepts and/or vocabulary in one or more subjects. The map can identify hierarchy, relationships, and/or coupling between different ideas and/or concepts that may not be obvious to a learner when learning a subject. A learner can interact with the map to indicate to a teacher (e.g., trainer) that the learner does or does not understand a connection between one or more nodes provided on the map. A teacher can monitor a learner's understanding of a node and/or node connection in real time by monitoring a leaner's interaction with the map, as described in detail elsewhere herein.

The architect can add metadata to one or more of the nodes in the map. The metadata can comprise keywords, images, videos, values, phrases, and other textual and/or visual descriptions that indicate a level of understanding of a node. The architect can add metadata to one or more of the connections between the one or more nodes in the map. The metadata can comprise keywords, values, phrases, and other textual descriptions that indicate a level of understanding of a connection between two of more nodes in the map. In some cases nodes and/or connections without metadata can be shown on the interface with a relatively lighter color compared to nodes and/or connections with metadata.

Returning to the example of the connected nodes "fruit" and "apple", these nodes can be associated metadata. The metadata can be a word or phrase that describes a physical characteristic, a description of use, an observable feature, a functional description, or any other term or phrase that indicates understanding of the node. For example, the node for "fruit" can have metadata tags associated with it such as, "food", "nutritious", "vitamins", "sweet", and/or "tart". Similarly, the node for "apple" can have metadata tags associated with it, for example, "red", "green", "crunchy", "juice", "core", and/or "seeds". Similarly, the node connection between the node for "fruit" and "apple" can have associated metadata. A connection between the node for "fruit" and the node for "apple" can have metadata that describes the connection between these two nodes. The metadata for the connection can comprise tags such as "type", "category", and/or "tree".

Figure 2:
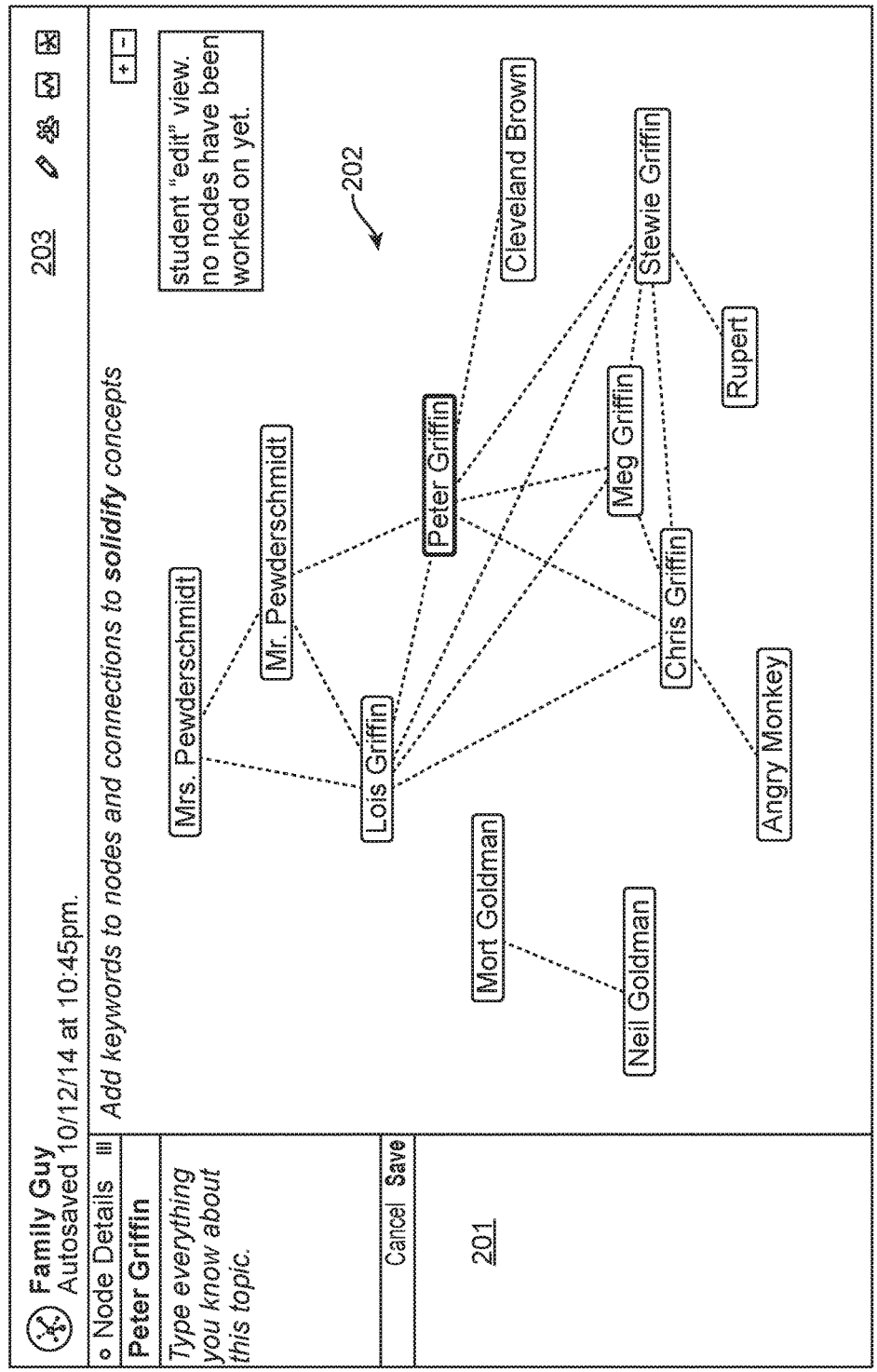
FIG. 2 shows a view of a map that can be provided to a learner in a user interface to enter notes on the map concepts during a lesson.

FIG. 2 shows a user interface through which a learner can take notes on concepts outlined in a map. The interface can comprise a text input panel 201, a map area 202, and a tool bar 203. The map can comprise the nodes and connections generated by the architect. The map can be a visual organization tool for the learner. A learner can select a node and/or a node connection, in some cases the node or node connection can be selected by clicking, hovering over, and/or touching (e.g., on a touchscreen) the node or connection. When a node or node connection is chosen it can be highlighted or shown in a different color from unselected nodes and/or node connections. The learner may not have access to the metadata entered by the architect that is associated with each node and/or node connection.

A learner can select one or more nodes and/or one or more node connections to enter data pertaining to the one or more nodes and/or one or more node connections. In some cases the data can be notes that a learner is taking during a lesson, conversation, presentation, lecture, and/or seminar. The notes can comprise words, phrases, sentences, number, numerical expressions, examples, and/or links. The learner can enter data pertaining to the one or more nodes and/or one or more node connections in the text input panel 201. Alternatively, the learner can enter data pertaining to the one or more nodes and/or one or more node connections in a floating text box.

The learner can enter data pertaining to the one or more nodes and/or one or more node connections without a question or problem prompt from a trainer. The learner can enter data while taking notes during a lesson or lecture. The learner can enter data that describes a node and/or node connection. The data entered by the learner can indicate how a learner cognitively perceives one or more concepts or connections represented by the one or more nodes and/or one or more node connections.

A text analysis can be performed on text entered by one or more learners in the text input panel 201 for each node and/or node connection. The text analysis can identify matches between metadata provided by the architect and text entered by the learner. In some cases a positive match between metadata provided by the architect and text entered by the learner can indicate that the learner correctly understands a concept represented by the node and/or node connection. In some cases, metadata can be given a prescribed weight value such that a positive match between metadata provided by the architect and text entered by the learner can be considered more or less important to assessing whether the learner correctly understands a concept represented by the node and/or node connection.

In some instances, the learner can receive feedback (e.g., from a trainer) based on matching between their text input and metadata provided by the architect. The feedback can be provided in real time. Alternatively, the feedback can be provided at predetermined intervals during the lesson, conversation, presentation, lecture, and/or seminar. The predetermined intervals can be set by a trainer during the lesson or at chosen intervals during the lesson. In some cases, feedback can be provided at the completion of the lesson, conversation, presentation, lecture, and/or seminar.

A trainer can be one or more individuals that provide the lesson, conversation, presentation, lecture, and/or seminar. A trainer can assess a level of understanding of one or more learners during the lesson, conversation, presentation, lecture, and/or seminar in real time. The trainer can assess the overall level of understanding of a group of learners and/or the level of understanding of an individual learner.

The level of understanding of one or more learners can be represented by an alignment score. The alignment score can represent an average of how well the text entered by the trainer matches the metadata words and phrases provided by the architect. The alignment score can be a weighted average such that matching between a first fraction of the text entered by the trainer matches the metadata words and phrases provided by the architect increases an alignment score more than matching between a second fraction of the text entered by the trainer matches the metadata words and phrases provided by the architect. Metadata that represents relatively more important concepts can be weighted to have a higher contribution to the alignment score when a trainer's text input matches with the architect's metadata.

Figure 3:
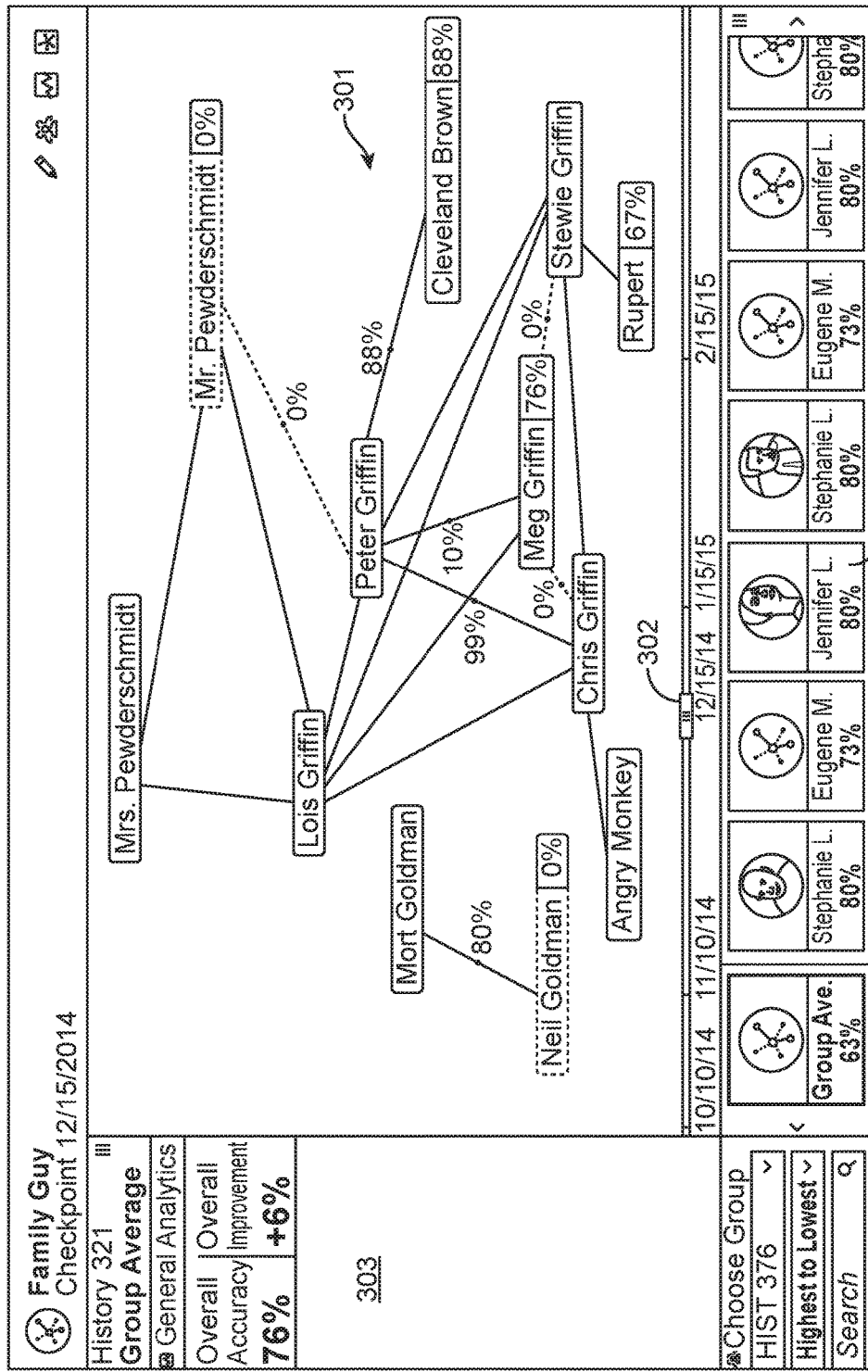
FIG. 3 shows a view of a map that can be provided to a trainer in a user interface to indicate an average alignment score of one or more learners in a group.

A trainer can view the alignment score for an individual learner, a fraction of a group of learners, and/or a group of learners. The trainer can view the alignment score in real time while a learner is entering text into the map. FIG. 3 shows an example of a user interface that can be provided to a trainer. The trainer's interface can comprise a version of a map 301 that is being viewed by one or more learners. In the trainers interface the map 301 can be updated in real time or at predetermined intervals to show one or more learner's level of understanding of the nodes and/or node connections provided in the map. The level of understanding of one or more learners can be displayed visually with shapes, colors, numerical values, and/or patterns that correspond to different levels of understanding. Levels of understanding can be correlated with an alignment score such that a low alignment indicates a low level of understanding and a high alignment score indicates a high level of understanding. The alignment score can be a percentage alignment between student entered data and architect metadata ranging from 0% to 100%.

The trainer user interface view can graphically depict changes in the alignment score of one or more learners over a specified time period. A scroll bar 302 provided in the user interface can permit a trainer to toggle between a first and second time period. A trainer can scroll between a first time period and a second time period to determine if the alignment score of one or more learners has increased, decreased, or remained the same. In some cases, a trainer can provide a lesson between the first and second time period. The trainer can determine if the lesson is effective by monitoring a change in alignment score for one or more nodes and/or node connections between the first and second time periods. In some cases a first and second time period can be separated by at least about 1 second (s), 15 s, 30 s, 1 minute (min), 5 min, 15 min, 30 min, 1 hour (hr), 2 hr, 3 hr, 4 hr, 5 hr, 10 hr, 1 day, 5 days, or 1 month.

The trainer interface can comprise a map 301 that visually describes the alignment score for one or more learners. The overall alignment score for the entire map 301 can be shown in a panel 303. The map can show a detailed description of the understanding of one or more learners for each node and/or each node connection. The alignment score of one or more nodes and/or node connections can be viewed by a trainer to identify gaps in understanding of a learner. The nodes and/or node connection can represent details of a process or idea such that a low alignment score on a node and/or node connection can indicate to a trainer that the concepts that are not well understood by one or more learners with the low alignment score.

For example, a map for the process of long division can comprise nodes for "divide" and "remainder". The node for "divide" can have the metadata tag "multiply" because multiplication is the opposite of division. The nodes for "divide" and "remainder" can be linked by a node connection line segment with metadata tags, for example, one metadata tag for the node connection can be "subtract" because the remainder is determined by subtracting a number after dividing. Providing a map to a learner with nodes for "divide" and "remainder" connected can help to prompt a learner to think about how these concepts may be connected. Furthermore, providing a map to a learner with nodes for "divide" and "remainder" connected can help aid a learner in organizing these concepts in their mind.

A learner can take notes on the long division map and a real time analysis of the map can be provided to the trainer to indicate that the learner matched the metadata tag "multiplication" but not "subtraction". The real time analysis can be used by the trainer to indicate that the trainer should emphasize the idea of obtaining a remainder through subtraction. When the learner matches the metadata tag for "subtraction" the trainer can view the alignment score to indicate that the learner understands that the remainder is obtained through subtraction. The method described can provide more information to a trainer compared to providing a learner with long division problems. When a learner is provided with long division problems a trainer can review the problems and determine that a problem is wrong but the wrong answer does not indicate which step of the process or connection between process steps a learner is misunderstanding. In comparison the map breaks the problem down into ideas and linkages so that a trainer can identify which ideas and/or linkages the learner does not understand.

In some cases, the alignment score associated with a node can be indicated by a color such that nodes with a high level of alignment for a learner or group of learners are displayed with a first color, nodes with a moderate level of alignment for a learner or group of learners are displayed with a second color, and nodes with a low level of alignment for a learner or group of learners are displayed with a third color. In some cases, the first, second, and third colors can be green, yellow, and red respectively. The node color can change abruptly when an alignment score falls above or below a predetermined threshold value. Alternatively, the node color can change gradually to transition from an initial color to a next color as an alignment score changes. In some cases, the nodes can be outlined by a solid or dashed line to further indicate an alignment score visually to the trainer. For example, a solid line boundary on a node can indicate a high level of alignment. Similarly a dashed line can indicate moderate alignment and a dotted line can indicate low alignment. In some embodiments, a dashed line can indicate 0% alignment.

Similarly, node connections can be displayed in the trainer interface to indicate a level of alignment between architect metadata associated with the node connection and data recorded by a learner for the node connection. The node connection can be displayed with a different color, shading, patter, or thickness to indicate a value of the alignment score. For example, a solid line representing a node connection can indicate a high level of alignment. Similarly a dashed line can indicate moderate alignment and a dotted line can indicate low alignment. In some embodiments, a dashed line can indicate 0% alignment.

Overall alignment for the whole map averaged for a group of learners can be shown in a panel 303. The panel can display both average accuracy and average improvement for the learners relative to a prior time period. Individual average alignment scores for the one or more learners can be shown in another panel 304. The panel 304 showing individual average alignment scores for the one or more learners can comprise a series of tiles with biographical information for each learner (e.g., headshot, name, age, grade). If the number of learners in a group exceeds a space requirement to show a tile for each learner the panel can comprise a scroll bar to change the subset of learners shown in the panel. The panel 304 showing individual average alignment scores for the one or more learners can show the learners overall average on the entire map or the average alignment score for one or more specified nodes and/or node connections. A menu 305 can permit a trainer to organize and/or sort a list of learners. The menu 305 can permit a trainer to toggle between different groups of learners and/or different maps.

Figure 4:
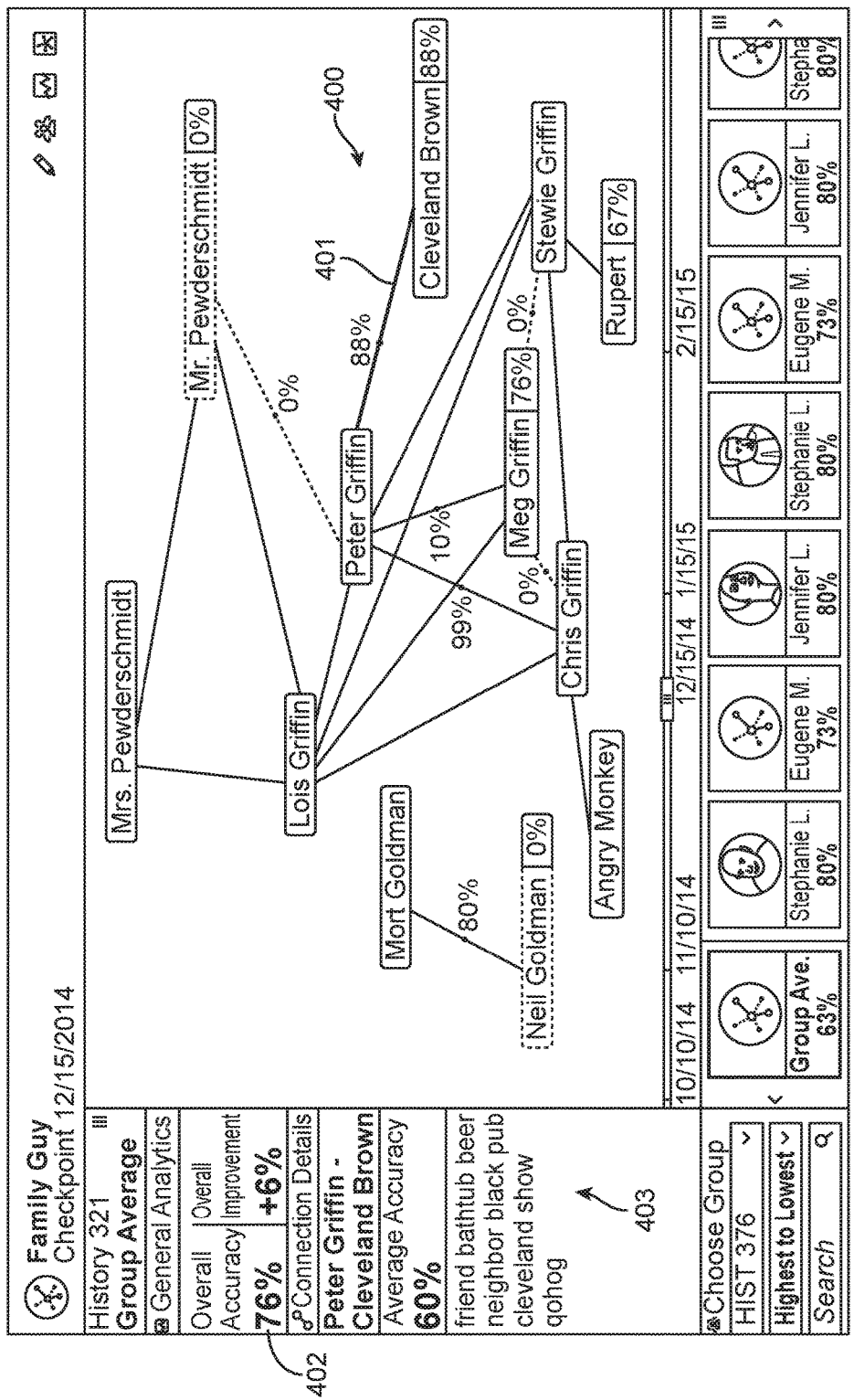
FIG. 4 shows a view of a map that can be provided to a trainer in a user interface to indicate an average alignment score on a specified node or node connection of one or more learners in a group.

A trainer can select one or more node connections and/or nodes to view an alignment score for one or more learners on a specific node, node connection, or subset of nodes and/or node connections. FIG. 4 shows a user interface 400 that can be viewed by a trainer when one or more nodes or node connections in a map is selected. In FIG. 4 a node connection 401 has been selected. A node connection can be displayed with a thicker line, highlighted line, or different colored line when selected by a trainer. The trainer can select a node connection, node, or subset of nodes and/or node connections by clicking, touching, and/or hovering over the node connection, node, or subset of nodes and/or node connections. When a node connection, node, or subset of nodes and/or node connections is chosen information about the alignment score for the node connection, node, or subset of nodes and/or node connections can be displayed in a panel 402. The alignment score shown in the panel 402 can be an alignment score for one learner or a group of learners. The panel 402 can also show a percentage of improvement between a current time stamp and a previous time stamp.

In some cases, the panel can show at least a fraction of the metadata 403 associated with the node connection, node, or subset of nodes and/or node connections. The metadata can include data about the node connections, nodes or subset of nodes and/or node connections. The metadata can be color coded to indicate an alignment score for specific metadata tags. Metadata tags with a high average alignment score for the one or more learners can be shown with a first shade, boldness, or color. Metadata tags with a relatively lower average alignment score for the one or more learners can be shown with a second shade, boldness, or color. Returning again to the apple example, when the node for "fruit" is selected the panel can display all of the metadata tags associated with the node fruit (e.g., "food", "nutritious", "vitamins", "sweet", and/or "tart"). If the alignment scores for "food", "nutritious", and "sweet" are above a predetermined threshold these metadata tags can be displayed with a first color and/or text boldness. If the alignment scores for "vitamins" and "tart" are below the predetermined threshold these metadata tags can be displayed with a second color and/or text boldness. The second color and first color can be different. The first color and the second color can be green and red respectively. Metadata tags that have been matched with a textual input from the specified learner can be visually indicated by coloring, shading, highlighting, and/or text boldness. Metadata tags that have not been matched with a textual input from the specified learner can be visually indicated by coloring, shading, highlighting, and/or text boldness. Metadata tags that have and have not been matched with a textual input from the specified learner can be displayed with different coloring, shading, highlighting, and/or text boldness. The trainer can view the list of metadata tags to identify concepts that are not well understood by the specified learner.

The metadata alignment can provide the trainer with a detailed view of the conceptual grasp that one or more learners has on a topic. The overall alignment score for the entire map can provide a first level view of the understanding that one or more learners has on a topic represented by the complete map. At the second level, the alignment score for a specified node or node connection can provide the trainer with a more detailed understanding of the how one or more learners is conceptualizing the specified node or node connection. At the third level, trainer can view specific metadata alignment for one or more learners for a specified node or node connection. Viewing the metadata alignment can indicate to a trainer which specific ideas and/or concepts are well understood and/or poorly understood by one or more learners. All three levels of detail, the first level (e.g., overall map alignment), second level (e.g., overall node and/or node connection alignment), and third level (e.g., alignment of specific metadata tags) can all be available in real time. In some cases alignments scores for each level can be viewed simultaneously by the trainer on the user interface.

Figure 5:
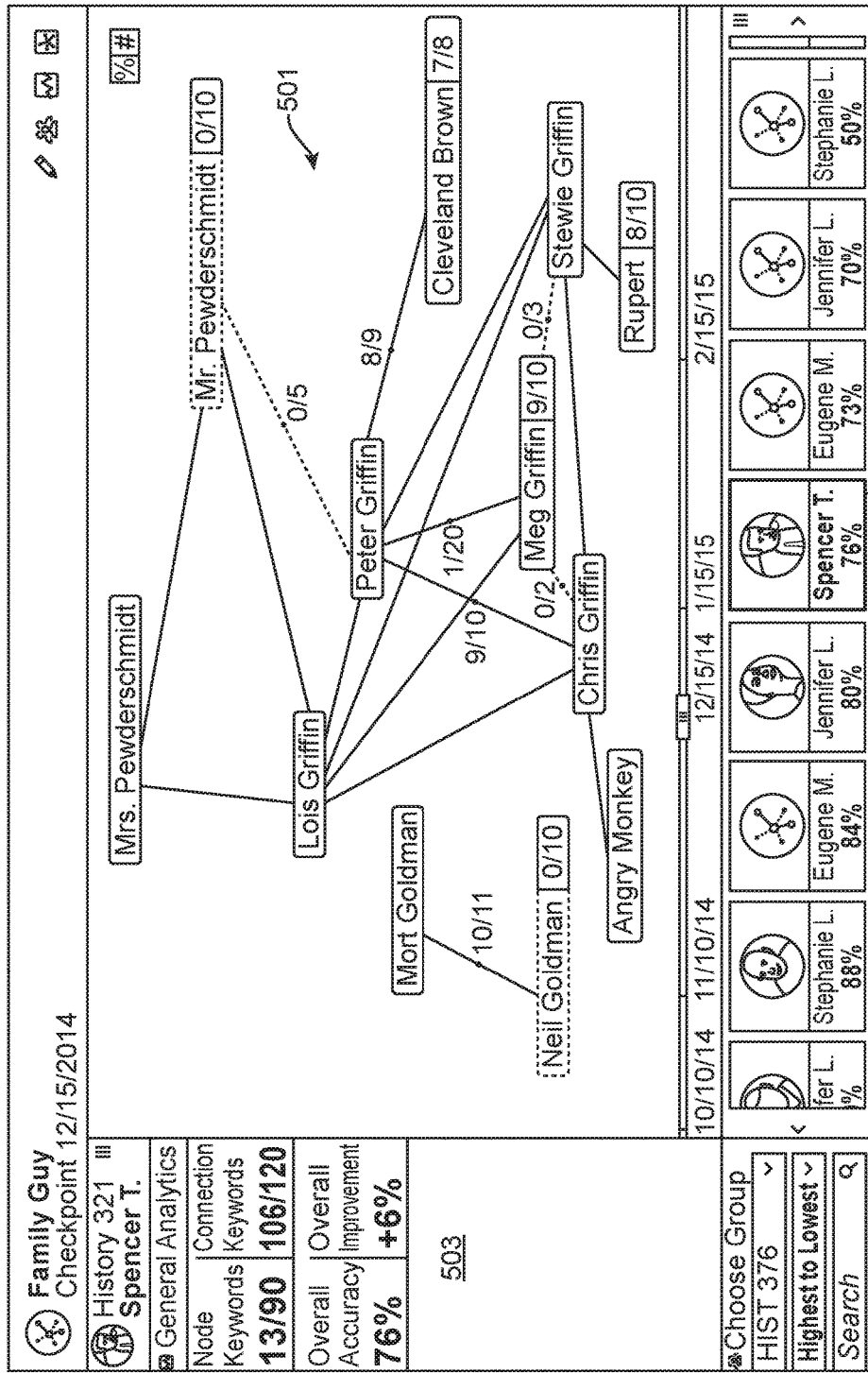
FIG. 5 shows a view of a map that can be provided to a trainer in a user interface to indicate an average alignment score of a specified learner.

A trainer can view one or more alignment scores for a specified learner. FIG. 5 shows a user interface that can be viewed by a trainer. The interface shows an alignment score for a specific learner. The interface can comprise a map 501 with nodes and node connections generated by the architect. The map 501 can have nodes and/or node connections with coloring, shading, and/or line thickness to visually indicate the alignment score of the specified learner. The specified learner can be chosen from a group of learners. The group of learners can be displayed in a panel 502. The specified learner can be chosen from the group of learners displayed in the panel 502 by clicking, touching, and/or hovering over a tile corresponding to the learner. The tile can comprise biographical information for the learner (e.g., headshot, name, age, grade). In some cases the panel can display tiles corresponding to one or more learners in a predetermined order. A menu 504 can permit a trainer to organize and/or sort a list of learners. The menu 504 can permit a trainer to toggle between different groups of learners and/or different maps. For example, the tiles can be ordered from highest to lowest alignment score or from lowest to highest alignment score. Alternatively, the tiles can be displayed in alphabetical order by first or last name of the learner. In some cases, the tiles can be in a random order.

A trainer can choose a specific learner from the group of learners. When a specific learner is chosen the map 501 can be displayed with alignment data that corresponds to the specific learner. The individual alignment data for the learner can be shown in a panel 503. The individual alignment score can be based on analysis (e.g., text analysis) of notes entered by the learner in the learner interface. The individual alignment data can comprise a ratio of total metadata tags that the learner has entered relative to the total metadata tags that exist (e.g., were stored in the map by the architect). In some case the ratio can be broken up into two ratios, a first ratio corresponding to total metadata tags entered for nodes relative to total metadata tags that exist for nodes in the map and a second ratio corresponding to total metadata tags entered for node connections relative to total metadata tags that exist for node connections in the map. The individually alignment data can further comprise an overall alignment score in the form of a percentage and a percentage of improvement in alignment score relative to an alignment score tabulated at one or more previous time stamps.

Figure 6:
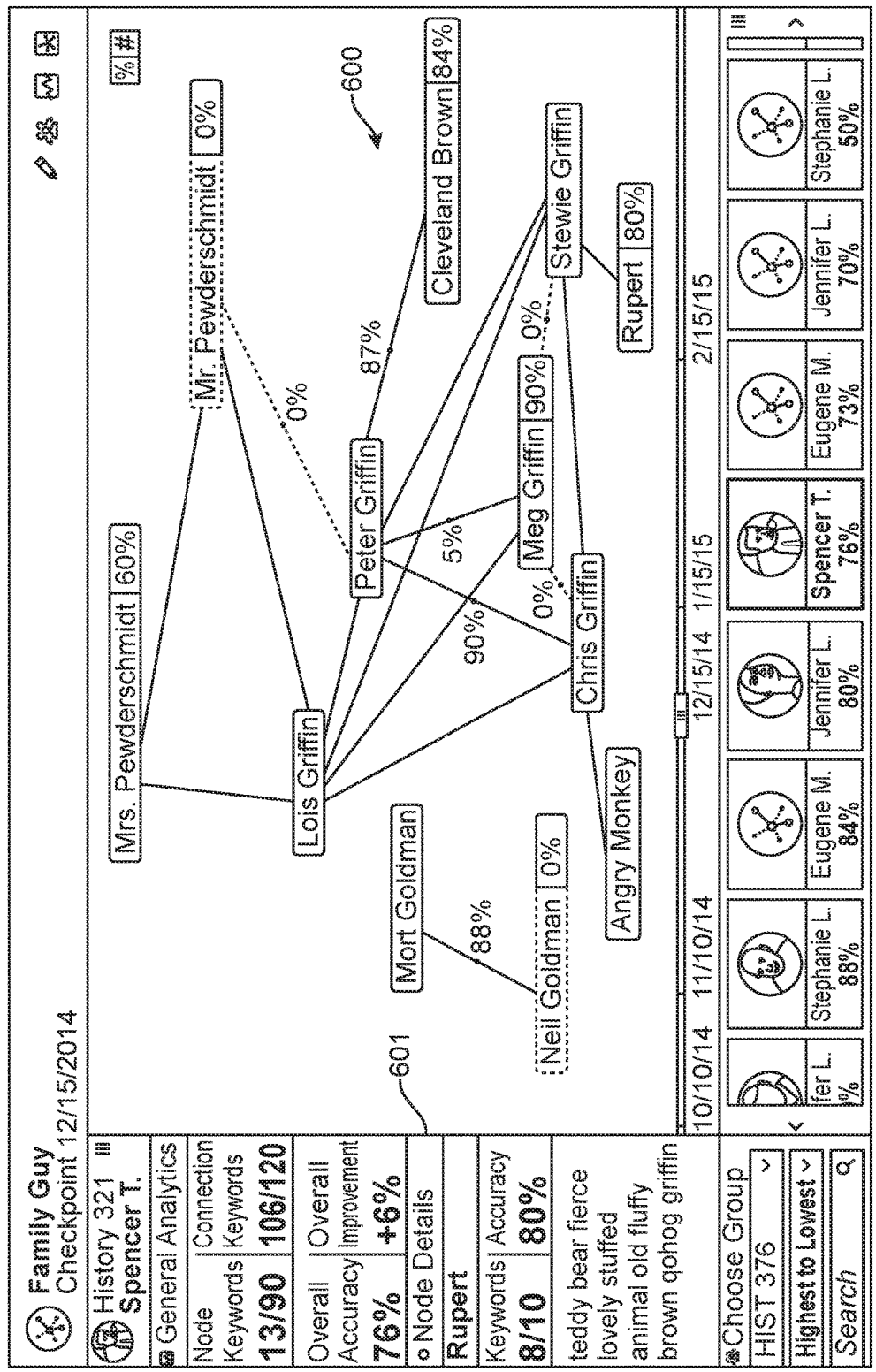
FIG. 6 shows a view of a map that can be provided to a trainer in a user interface to indicate an alignment score of a specified node or node connection of a specified learner.

The trainer can select one or more nodes or node connections to view metadata alignment for the node or node connection for the specified learner. FIG. 6 shows an example of an interface 600 that can be viewed by the trainer when a node or node connection is chosen for the specified learner. A node connection can be displayed with a thicker line, highlighted line, or different colored line when selected by a trainer. The trainer can select a node connection, node, or subset of nodes and/or node connections by clicking, touching, and/or hovering over the node connection, node, or subset of nodes and/or node connections. When a node connection, node, or subset of nodes and/or node connections is chosen information about the alignment score for the node connection, node, or subset of nodes and/or node connections can be displayed in a panel 601. The panel can comprise biographical data to describe the specified learner. The panel 601 can further comprise individual alignment data for the learner for the entire map (e.g., overall alignment score and/or ratio of total metadata tags entered by the learner to total metadata tags provided by the architect) and alignment data for the chosen node or node connection. The alignment data for the chosen node or node connection can comprise a ratio of the number of metadata tags entered by the learner relative to all of the metadata tags for the chosen node or node connection that were entered by the architect. The alignment data for the chosen node or node connection can comprise a percentage alignment score for the specified learner. The alignment data for the chosen node or node connection can further comprise a list of metadata tags associated with the node or node connection. The list of metadata tags can comprise all of the metadata tags entered by the architect for the chosen node or node connection. The trainer can identify gaps in learning of one or more students in real time and provide lessons aimed at concepts that are not well understood by one or more learners as indicated by the user interface.

Figure 7:
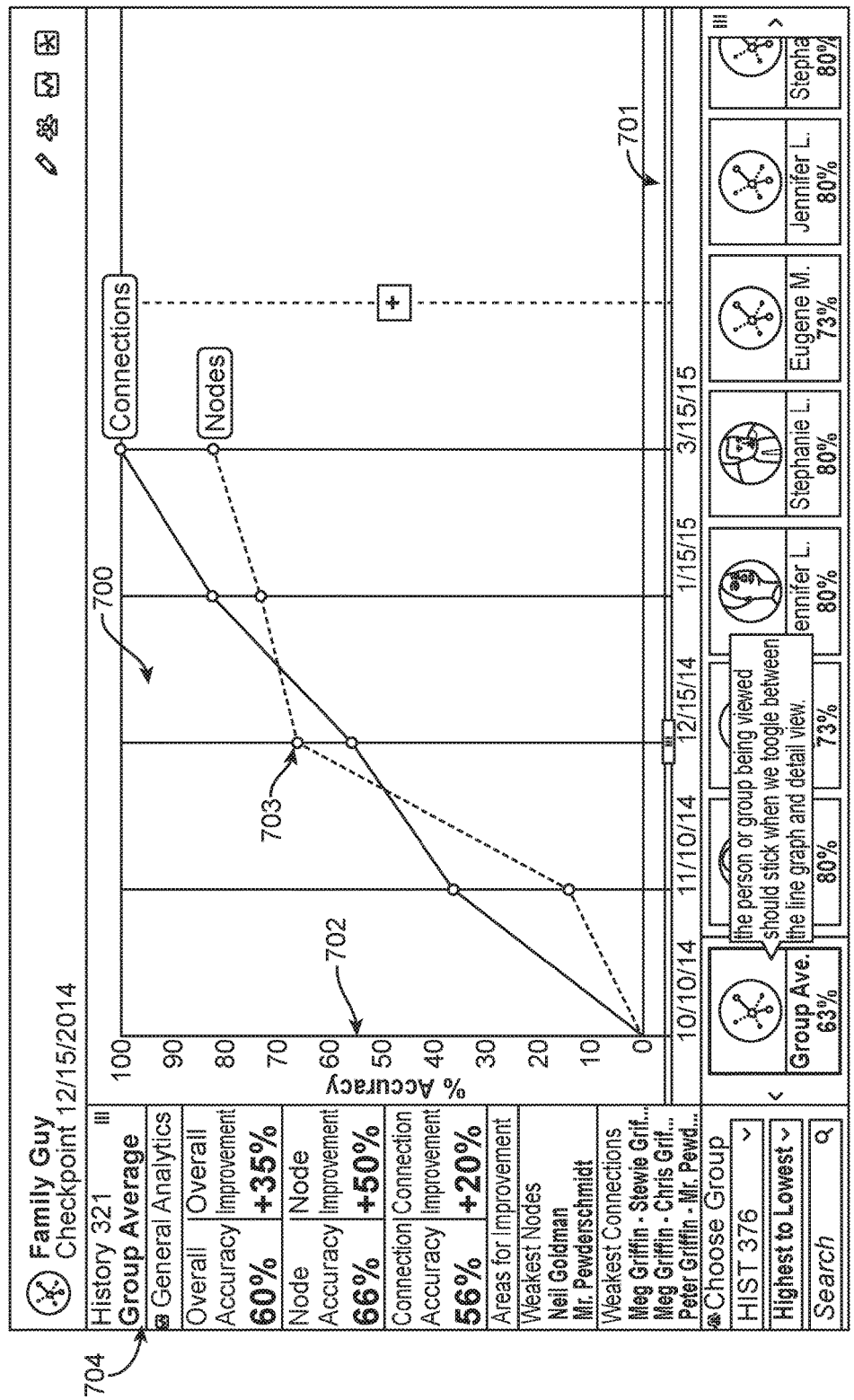
FIG. 7 shows a graph of alignment score as a function of time that can be provided to a trainer in a user interface to show changes in alignment score over time for a group of one or more learners.

The trainer can view alignment score as a function of time graphically in a user interface. FIG. 7 shows an example of a graph 700 that can be viewed by the trainer. An x-axis 701 of the graph can be the time variable. The time variable can be divided into any interval length, for example, the time interval can be seconds, minutes, hours, days, weeks, months, and/or years. A y-axis 702 of the graph can be the alignment score variable. The alignment score can be calculated for one or more learners at chosen time stamps to generate data points 703 in the graph. In some cases a time interval between a first and second data point may not be the same length as the time interval between a second and third data point. The first and second data points and second and third data points can be displayed in the graph with identical spacing along the x-axis even if the time intervals between the first and second data points and second and third data points are not the same.

The time stamps can be automatically placed at regular intervals. The time stamps can be placed at irregular intervals. In some cases, a trainer can set each time stamp individually by providing an input to the user interface indicating that a time stamp and corresponding data point should be generated. For example, a trainer can begin a lesson. At the beginning of the lesson the trainer can set a time stamp that can calculate the alignment score at the beginning of the lesson to generate the initial data point. In some cases the alignment score for the initial data point can be 0%. After providing a section of the lesson the trainer can provide instruction through the user interface to generate a next time stamp with an alignment score calculation and to add the corresponding data point to the graph. The trainer can periodically generate data points throughout a lesson. The trainer can view the data points to judge the effectiveness of the lesson. For example if alignment score increases between a first and second lesson this can indicate to the trainer that a lesson was effective.

In addition to the graphical representation of the alignment score, the interface shown in FIG. 7 can also provide an alignment summary to the trainer in a panel 704. The alignment summary can comprise an overall alignment score for one or more learners at a current or historical time stamp, an overall improvement in alignment score for one or more learners between a current or historical time stamp and a previous time stamp, and/or average alignment scores for nodes and/or node connections. The average alignment score for the nodes can comprise an average score of alignment on all of the nodes in the map for one or more learners. An average improvement score for all of the nodes can be displayed, the average improvement score can be based on a change between a node alignment score at a current or historical time stamp and a node alignment score at a previous time stamp. Similarly, the average alignment score for the node connections can comprise an average score of alignment on all of the node connections in the map for one or more learners. An average improvement score for all of the node connections can be displayed, the average improvement score can be based on a change between a node connection alignment score at a current or historical time stamp and a node connection alignment score at a previous time stamp. A summary of areas for improvement can be displayed in the panel 704. The summary of areas for improvement can comprise a list of nodes and/or node connections with the lowest average alignment score for one or more learners.

Figure 8:
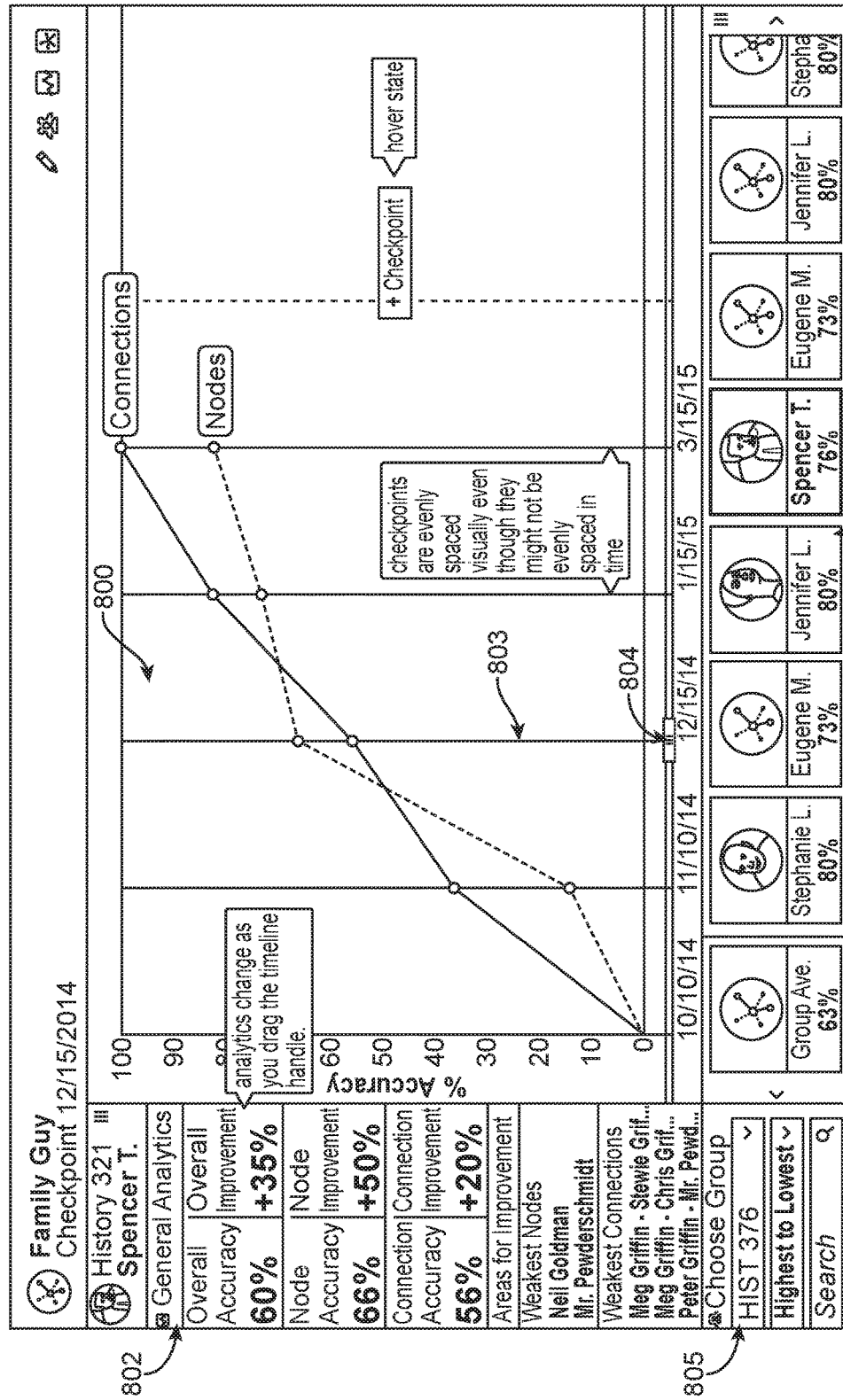
FIG. 8 shows a graph of alignment score as a function of time that can be provided to a trainer in a user interface to show changes in alignment score over time for a specified learner.
Figure 9:
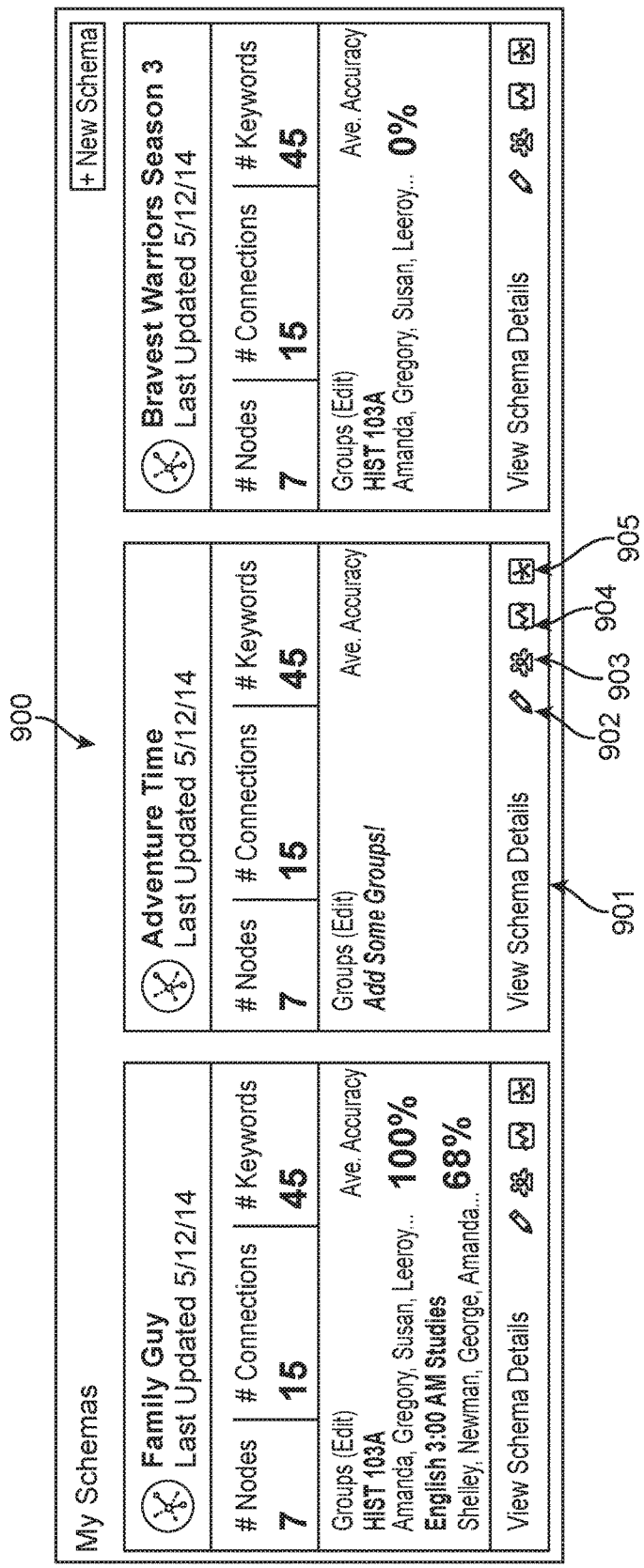
FIG. 9 shows a home page that can be viewed by a trainer in a user interface to summarize maps in use by the trainer.

A trainer can toggle between data points 703 in the graph 700 by selecting a data point. When a data point is selected the panel 704 can display alignment data associated with the selected data point. Similarly a trainer can toggle between different learners in a group of learners to view a graph that shows alignment score data for a specified learner. FIG. 8 shows a graph 800 of alignment score as a function of time for a specified learner. The specified learner can be chosen from the group of learners displayed in a panel 801 by clicking, touching, and/or hovering over a tile corresponding to the learner. The tile can comprise biographical information for the learner (e.g., headshot, name, age, grade). In some cases the panel can display tiles corresponding to one or more learners in a predetermined order. A menu 805 can permit a trainer to organize and/or sort a list of learners. The menu 805 can permit a trainer to toggle between different groups of learners and/or different maps. For example, the tiles can be ordered from highest to lowest alignment score or from lowest to highest alignment score. Alternatively, the tiles can be displayed in alphabetical order by first or last name of the learner. In some cases, the tiles can be in a random order. When a specified learner is chosen alignment data for the learner can be displayed as a function of time in the graph 800. A trainer can select a specific data point to view detailed information about the data point. The detailed information can be shown in a panel 802.

The panel 802 can comprise a visual display of biographical data for the specified learner, overall alignment data, and/or specific alignment data associated with the specified learner. The overall alignment data can comprise an overall accuracy score for the specified learner. The overall accuracy score can be based on a percentage of key words that a learner has matched with the architect's metadata for all of the nodes and/or node connections in the map. The overall alignment data can additionally comprise a measure of improvement, for example a percent increase in alignment score. The measure of improvement can be improvement between the alignment score at the selected data point and one or more previous data points. The specific alignment data can comprise overall alignment score on one or more nodes, overall alignment score on one or more node connections, an improvement measure for one or more nodes, and/or an improvement score for one or more node connections. Additionally, the panel 802 can comprise suggested areas for improvement. Suggested areas for improvement can be a list of nodes and/or node connections that can be improved for the specified student. In some cases, the nodes and/or node connections that are displayed as areas for improvement can be nodes and/or node connections that have a relatively low alignment score compared to other nodes and/or node connections for the specified student. The nodes and/or node connections that are displayed as areas for improvement can be nodes and/or node connections with a relatively low alignment score compared to an average alignment score for the same nodes and/or node connections of one or more other learners. The nodes and/or node connections that are displayed as areas for improvement can be nodes and/or node connections that have a relatively low improvement in alignment score over a specified time period compared to other nodes and/or node connections for the specified student and/or compared to the same nodes and/or node connections of one or more other learners.

When viewing the graph of alignment score as a function of time for a specified learner or for a group of learners the trainer can toggle between different data points by sliding a bar 803, sliding a block 804, or clicking a data point. The data displayed in the panel for the specified learner 802 or the panel for the group of learners 704 can change to correspond with the chosen data point.

The trainer can view a home screen 900 displayed in the user interface. The home screen can comprise one or more tiles 901. The tiles can represent and link to different maps that the trainer can provide to one or more learners during a lesson. The tile can comprise the title of the map, the number of nodes in the map, the number of node connections in the map, the number of total metadata tags in the map, a date of the latest update to the metadata in the map, a date when the map was last used during a lesson, a recommended age range for learners that can use the map, and/or other information to describe the map. The tile can also have a display of information about learners that have used the map represented by the tile. The information displayed can include a name of a group of learners that have used the map (e.g., "history 103A"), a list of names of at least a fraction of the learners in the group, an average alignment score for the one or more groups, and/or an average improvement score for the one or more groups. The tile can comprise icons that link to different features and/or views associated with the map represented by the tile. A first icon 902 can link to an editing page for the map. When the trainer links to the editing page the trainer can edit the metadata, nodes, and/or node connections. A second icon 903 can be selected to add or edit (e.g., add or remove learners) a group. A third icon 904 can be selected to view a graph (e.g., line graph, bar graph, pie graph) representation of the alignment data as a function of time, for example, the graphs shown in FIG. 7 and FIG. 8. A fourth icon 905 can be selected to view a map view of the nodes and/or node connections, for example, the map views shown in FIGS. 3-6.

Similarly, a learner can view a home screen 1000. The home screen displayed to the learner can comprise tiles that correspond to maps that a learner has worked with. The tiles that are displayed on the map can be controlled and/or chosen by the trainer. The tile can comprise the title of the map, the number of nodes in the map, the number of node connections in the map, the number of total metadata tags in the map, a date of the latest update to the metadata in the map, a date when the map was last used during a lesson, and/or other information to describe the map. Information about the learner's progress and/or alignment score can be displayed on the tile. For example, the tile can display the total node and/or node connection keywords (e.g., metadata tags) that the learner has matched relative to the total number of key words in the map. The tile can display an average alignment score for the learner. The tile can comprise an icon 1001 that links to an editing page for the map. When the learner links to the editing page the learner can edit the textual notes in the map. The textual notes comprise the text input that will be analyzed to find keywords to match with the node and/or node connection metadata.

Computer Systems

Figure 11:
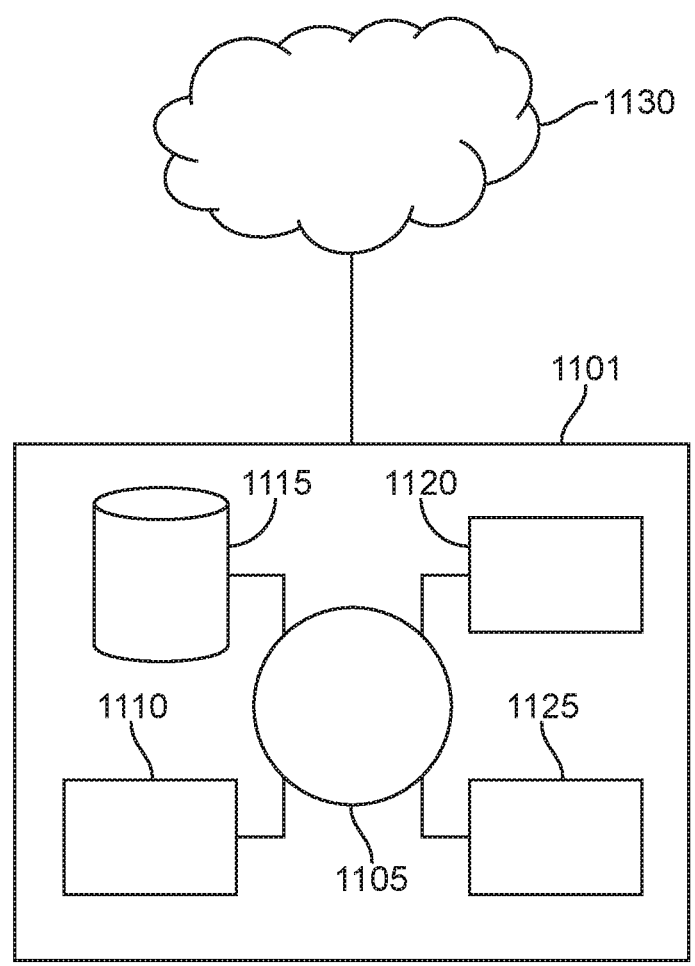
FIG. 11 shows a computer system configured to perform systems and methods for monitoring and providing feedback to a trainer about learners.

The present disclosure provides computer systems that are programmed to implement methods of the disclosure. FIG. 11 shows a computer system 1101 that is programmed or otherwise configured to collect input from an architect to generate a map, collect input from a learner interacting with the map, and provide real time feedback to a trainer about the learner's interaction with the map.

The computer system 1101 includes a central processing unit (CPU, also "processor" and "computer processor" herein) 1105, which can be a single core or multi core processor, or a plurality of processors for parallel processing. The computer system 1101 also includes memory or memory location 1110 (e.g., random-access memory, read-only memory, flash memory), electronic storage unit 1115 (e.g., hard disk), communication interface 1120 (e.g., network adapter) for communicating with one or more other systems, and peripheral devices 1125, such as cache, other memory, data storage and/or electronic display adapters. The memory 1110, storage unit 1115, interface 1120 and peripheral devices 1125 are in communication with the CPU 1105 through a communication bus (solid lines), such as a motherboard. The storage unit 1115 can be a data storage unit (or data repository) for storing data. The computer system 1101 can be operatively coupled to a computer network ("network") 1130 with the aid of the communication interface 1120. The network 1130 can be the Internet, an internet and/or extranet, or an intranet and/or extranet that is in communication with the Internet. The network 1130 in some cases is a telecommunication and/or data network. The network 1130 can include one or more computer servers, which can enable distributed computing, such as cloud computing. The network 1130, in some cases with the aid of the computer system 1101, can implement a peer-to-peer network, which may enable devices coupled to the computer system 1101 to behave as a client or a server.

The CPU 1105 can execute a sequence of machine-readable instructions, which can be embodied in a program or software. The program or software can be instructions to generate the map display on a user interface and permit interaction of an architect, learner, and/or trainer with the map with the functionality discussed in this application. The instructions may be stored in a memory location, such as the memory 1110. Examples of operations performed by the CPU 1105 can include fetch, decode, execute, and writeback.

The CPU 1105 can be part of a circuit, such as an integrated circuit. One or more other components of the system 1101 can be included in the circuit. In some cases, the circuit is an application specific integrated circuit (ASIC).

The storage unit 1115 can store files, such as drivers, libraries and saved programs. The storage unit 1115 can store user data, e.g., user preferences and user programs. The computer system 1101 in some cases can include one or more additional data storage units that are external to the computer system 1101, such as located on a remote server that is in communication with the computer system 1101 through an intranet or the Internet.

The computer system 1101 can communicate with one or more remote computer systems through the network 1130. For instance, the computer system 1101 can communicate with a remote computer system of a user (e.g., operator). Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 1001 via the network 1030.

Methods as described herein can be implemented by way of machine (e.g., computer processor) executable code stored on an electronic storage location of the computer system 1101, such as, for example, on the memory 1110 or electronic storage unit 1115. The machine executable or machine readable code can be provided in the form of software. During use, the code can be executed by the processor 1105. In some cases, the code can be retrieved from the storage unit 1115 and stored on the memory 1110 for ready access by the processor 1105. In some situations, the electronic storage unit 1115 can be precluded, and machine-executable instructions are stored on memory 1110.

The code can be pre-compiled and configured for use with a machine having a processer adapted to execute the code, or can be compiled during runtime. The code can be supplied in a programming language that can be selected to enable the code to execute in a pre-compiled or as-compiled fashion.

Aspects of the systems and methods provided herein, such as the computer system 1101, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such memory (e.g., read-only memory, random-access memory, flash memory) or a hard disk. "Storage" type media can include any or all of the tangible memory of the computers, processors or the like, or associated modules thereof, such as various semi-conductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 1101 can include or be in communication with an electronic display that comprises a user interface (UI) for providing, for example, views of the map and or alignment score data to the architect, learner, and/or trainer as described herein. The user interface can permit editing of the map. When the architect views the map in the user interface, editing can comprise adding and/or removing one or more nodes and/or node connection. The architect can also add or remove metadata from the map when editing the map in the user interface. When a learner views the user interface the learner can edit the map by taking notes on one or more nodes and/or node connections displayed in the map. When a trainer views the map the trainer can edit which students are in the group. Examples of UI's include, without limitation, a graphical user interface (GUI) and web-based user interface.

Figure 12:
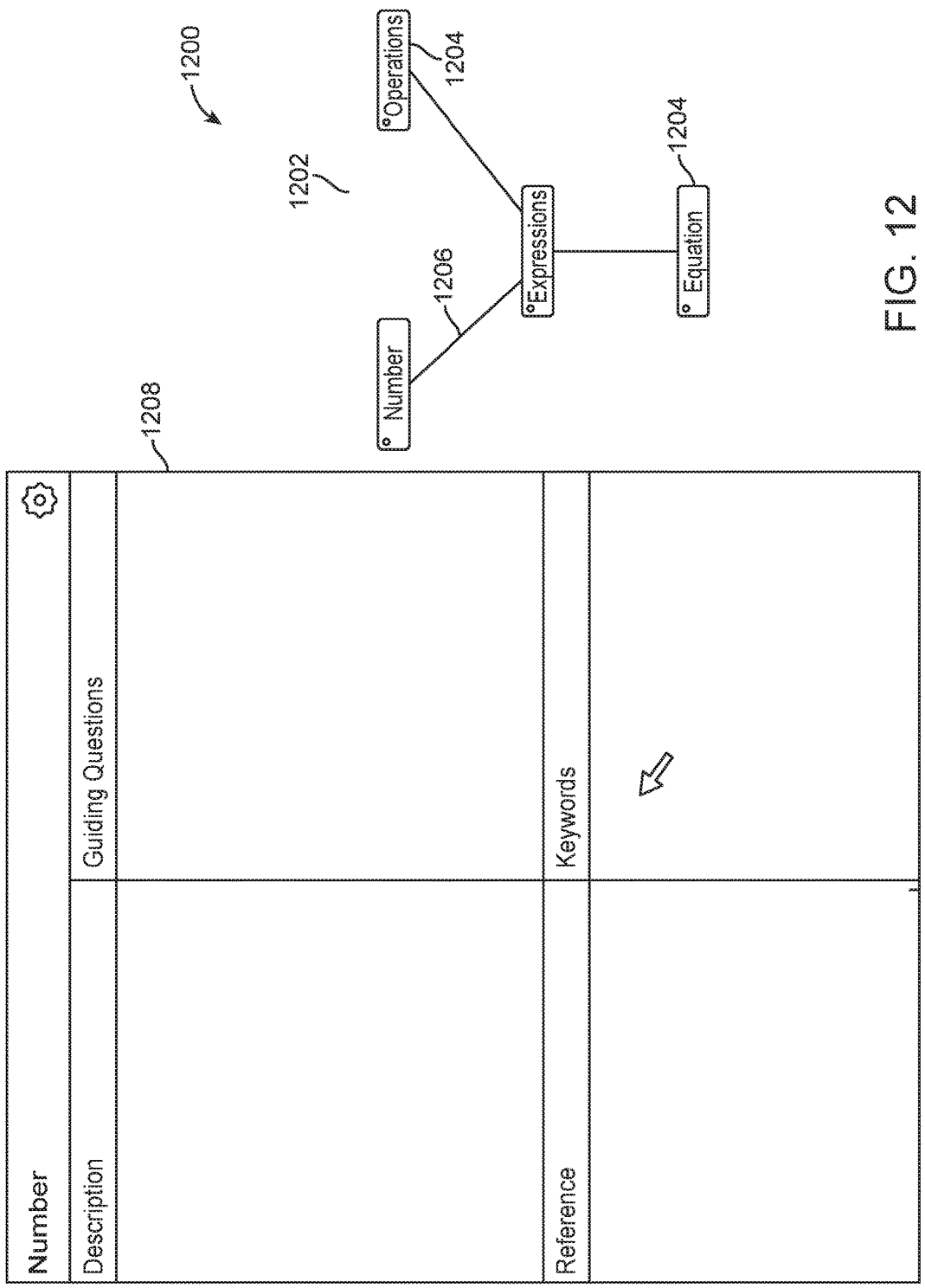
FIG. 12 shows a user interface that can be provided to an architect to build a concept from a blank map canvas.

FIG. 12 shows a user interface that can be provided to an architect to build a concept from a blank map canvas. As previously described in FIG. 1, an architect can generate a map in a map building canvas with words and/or phrases. In some cases the architect can "drag and drop" words and/or phrases from a word bank into the map building area to generate a map. The architect can put words that have a conceptual connection in close proximity to each other on the map. For example, as shown in FIG. 12, the architect can put the words "number," "operations," expressions," and "equation" in close proximity to each other on canvas 1202. In some cases, an architect can show hierarchy in one or more concepts by orienting one or more nodes in a linear formation on the map.

The architect can connect one or more nodes in the map with one or more line segments (e.g., node connections). A map can comprise one or more connected nodes (e.g., 1204). A node can be a word or phrase, in some cases, the word or phrase can be displayed in the map in a shape (e.g., square, circle, oval). A node can be representative of a keyword or concept. Each node can be connected to one or more other nodes. A connection between two or more nodes can represent a conceptual link. For example nodes for "number" and "operations" can be connected to "expressions" which can be in turn connected to "equation," representing a mathematical concept. In some cases, a connection can be shown with one or more line segments 1206.

The map generated by the architect can organize concepts to show hierarchy, relationships, and/or coupling between different ideas and/or concepts. The map can be provided to a learner to help the learner organize key concepts and/or vocabulary in one or more subjects. The map can identify hierarchy, relationships, and/or coupling between different ideas and/or concepts that may not be obvious to a learner when learning a subject. A learner can interact with the map to indicate to a teacher (e.g., trainer) that the learner does or does not understand a connection between one or more nodes provided on the map. A teacher can monitor a learner's understanding of a node and/or node connection in real time by monitoring a leaner's interaction with the map, as described in detail elsewhere herein.

The architect can add metadata to one or more of the nodes in the map. The metadata can comprise keywords, images, videos, values, phrases, and other textual and/or visual descriptions that indicate a level of understanding of a node. The architect can add metadata to one or more of the connections between the one or more nodes in the map. The metadata can comprise keywords, values, phrases, and other textual descriptions that indicate a level of understanding of a connection between two of more nodes in the map. In some cases nodes and/or connections without metadata can be shown on the interface with a relatively lighter color compared to nodes and/or connections with metadata.

As shown in FIG. 12, the node "number" can include metadata 1208. The metadata can comprise, for example, (1) a functional description of the concept represented by the node, (2) question to guide a learner in learning about the concept, (3) reference(s) that a learner can use or visit to supplement learning of the concept, and (4) keywords associated with the concept. During the learning process, the learner may enter observations which are then textually analyzed and compared against the keywords, in order to determine keyword match. Keywords identified in the learner's observation can demonstrate the learner's mastery of various aspects of the concept represented by the node.

Figure 13:
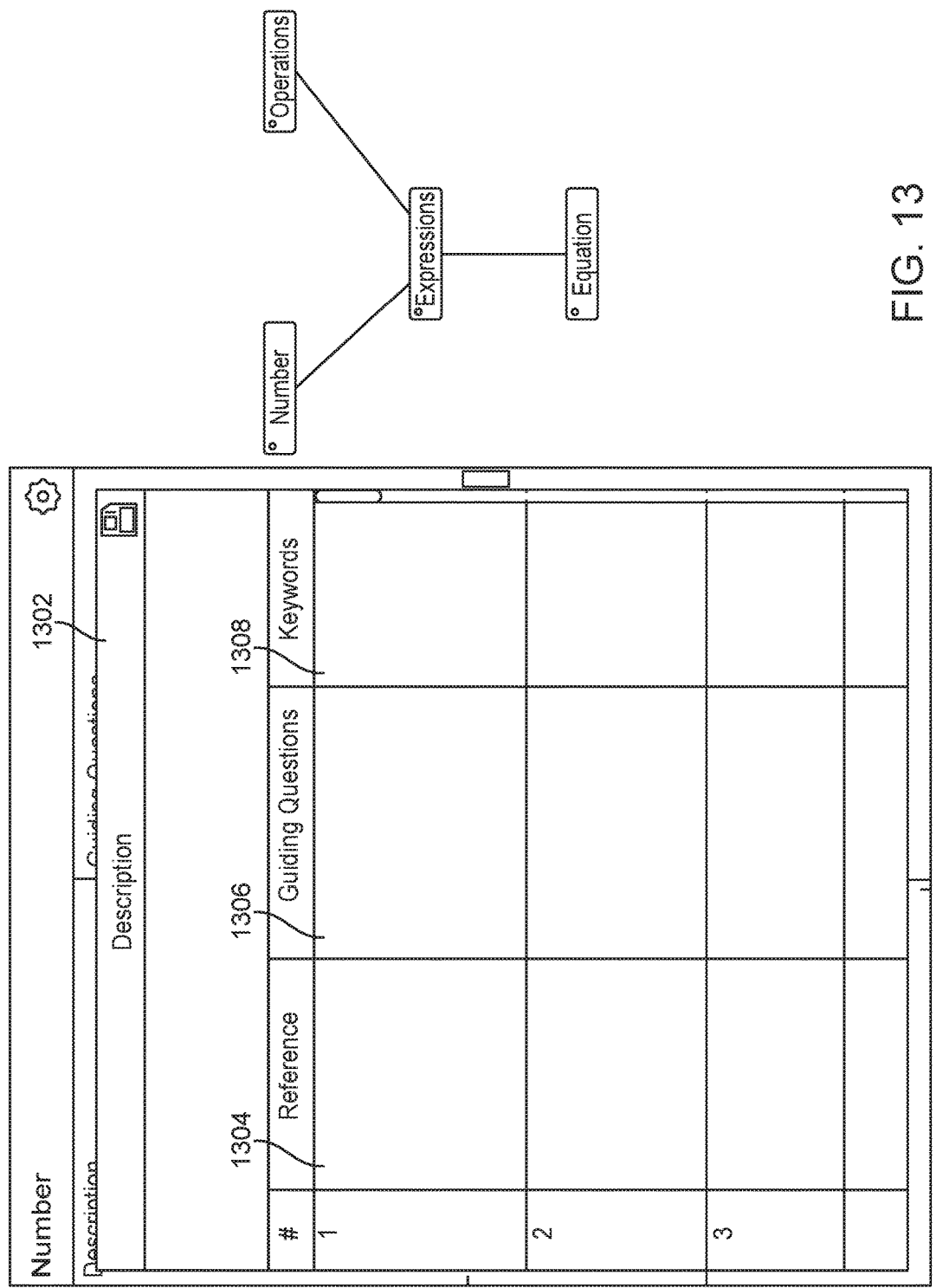

FIGS. 13 and 14 show a user interface that can be provided to an architect to start building the concept map of FIG. 12. The architect can enter metadata associated with the "number" node. For example, referring to FIG. 13, the architect can enter a brief description 1302 about the node, one or more references 1304, one or more guiding questions 1306, and one or more keywords 1308. An example of metadata entered by the architect is shown in FIG. 14. The reference may include a link to Khan Academy which can be a website that has learning materials about numbers. The guiding questions can include a question that asks the learner "What are the five key components needed to solve the problem in the video?" The keywords associated with the "number" concept can include "expression", "no change," and "represent." After the metadata has been entered and saved by the architect, FIG. 15 may be generated.

Figure 16:
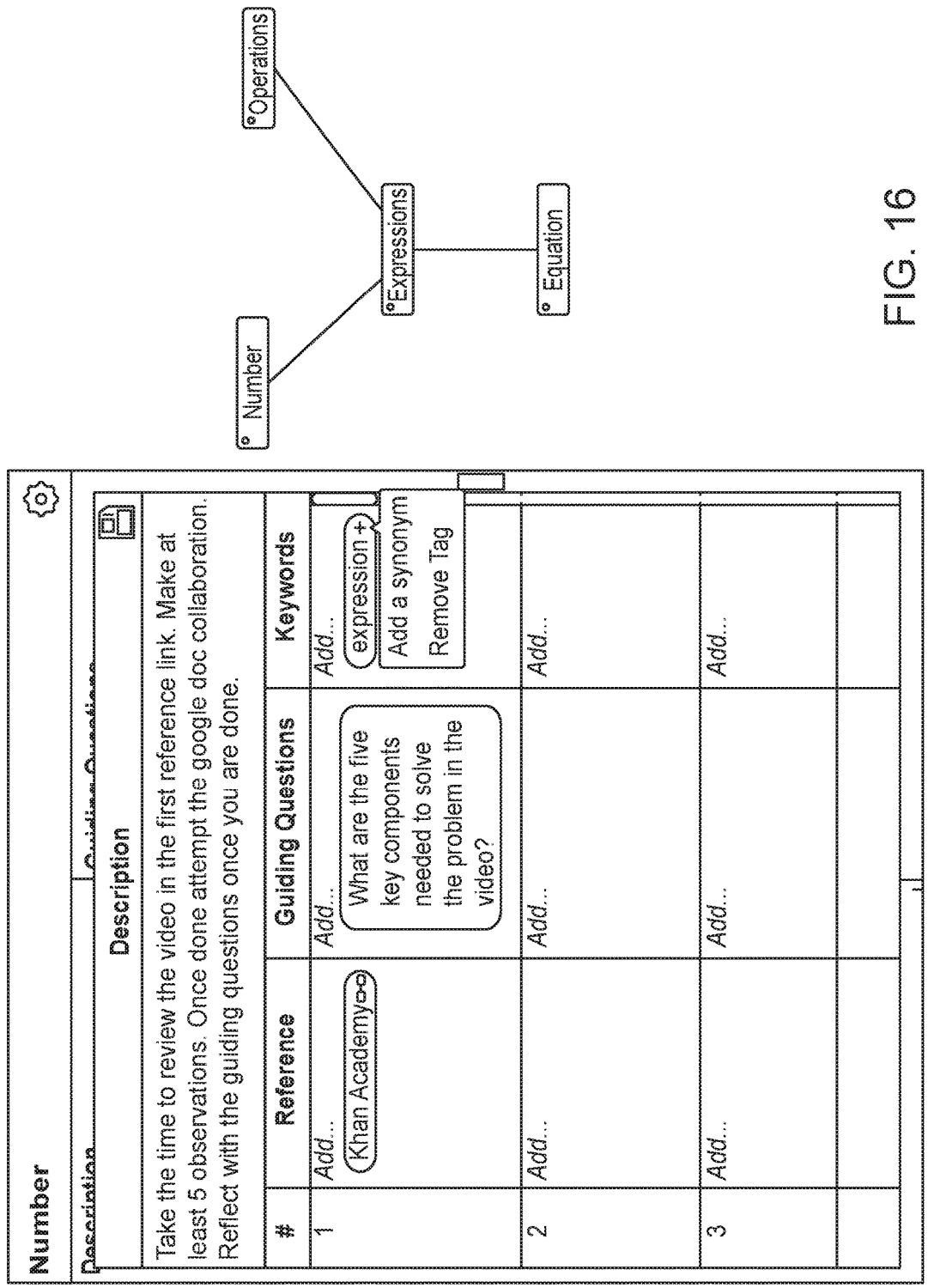
Figure 17:

In some embodiments, synonyms can be added for keywords. For example, FIGS. 16, 17, and 18 show the addition of synonyms associated with the keyword "expression" in FIG. 15. The synonyms may include "statement," "model," and "show." The keyword "expression" is updated to "expression (3)" in FIG. 18, to indicate that this keyword further includes three synonyms. When the learner's observation is compared against the keywords to determine keyword matches, it is also compared against the synonyms (if any) for each keyword. For example, in FIG. 18, a keyword match is identified when the keyword "expression" is found in the user's observations. Additionally, keyword matches may be identified when the synonyms associated with the keyword "expression" (corresponding to "statement," "model," and "show") are found in the user's observations.

Figure 19:
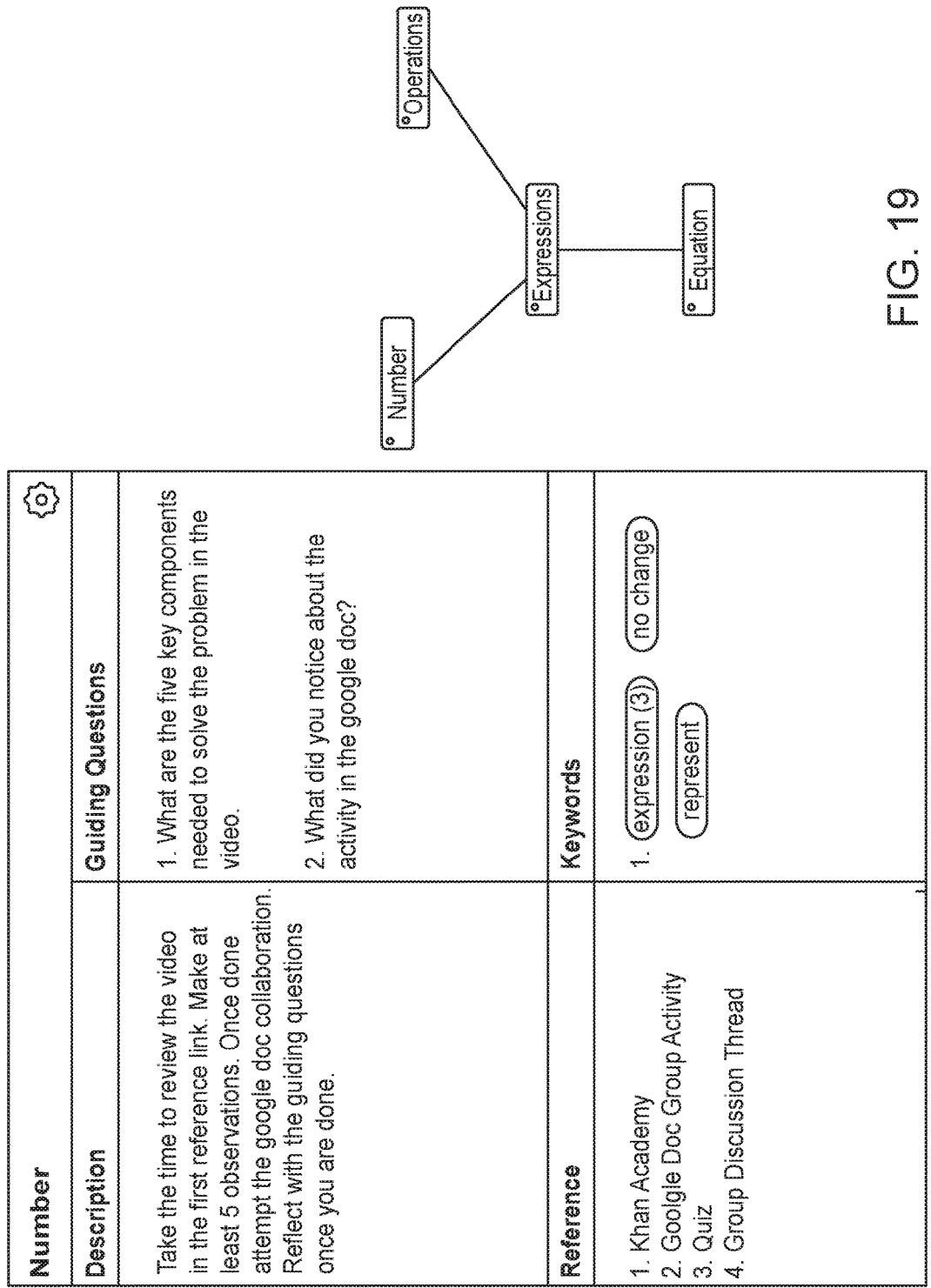
FIG. 19 shows additional references being added to the user interface in FIG. 15.

FIG. 19 shows additional references being added to the user interface in FIG. 15. For example, the additional references may include "Google Doc Group Activity," "Quiz," and "Group Discussion Thread." A learner may use or visit the additional references to find out more information and to learn about a concept (e.g., the concept "number").

Figure 20:
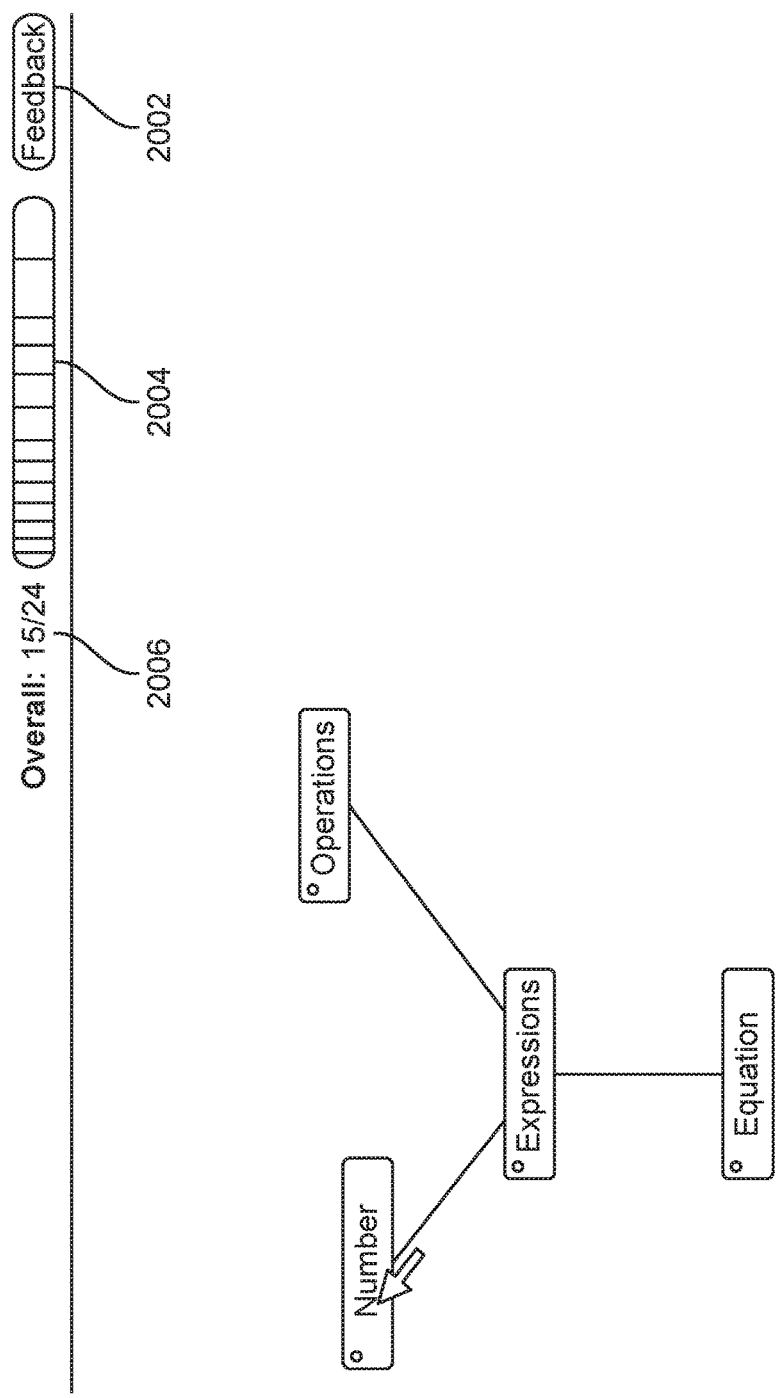
FIG. 20 shows a concept map that can be provided to a learner during a lesson.

FIG. 20 shows a concept map that can be provided to a learner during a lesson. The map generated by the architect can organize concepts to show hierarchy, relationships, and/or coupling between different ideas and/or concepts. The map can be provided to a learner to help the learner organize key concepts and/or vocabulary in one or more subjects. The map can identify hierarchy, relationships, and/or coupling between different ideas and/or concepts that may not be obvious to a learner when learning a subject. A learner can interact with the map to indicate to a teacher (e.g., trainer) that the learner does or does not understand a connection between one or more nodes provided on the map. A teacher can monitor a learner's understanding of a node and/or node connection in real time by monitoring a leaner's interaction with the map, as described in detail elsewhere herein.

Figure 21:
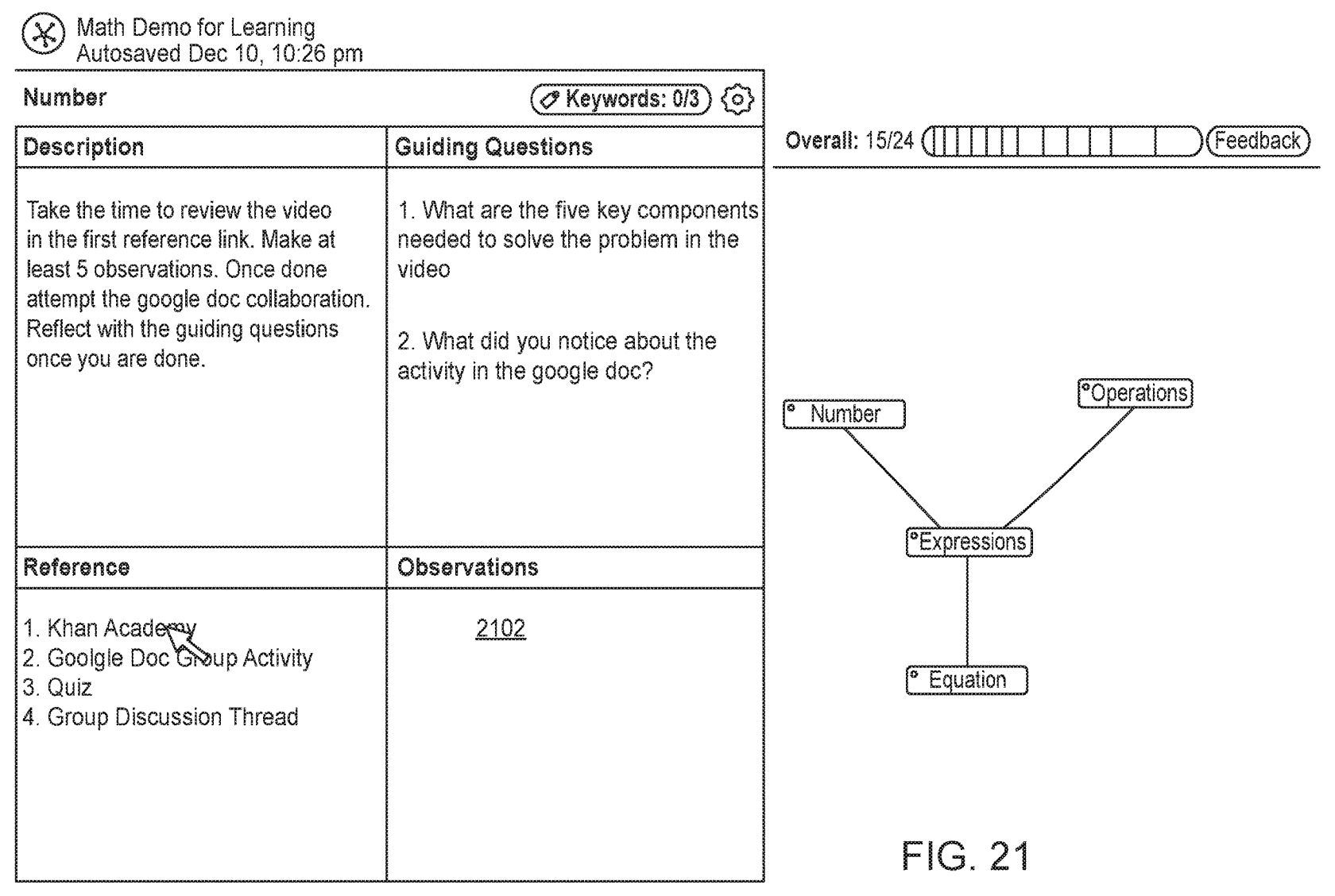

FIG. 21 shows a user interface that that can be provided to a learner to enter observations when learning about a concept. Comparing FIG. 21 and FIG. 19, the learner's user interface may be similar to the architect's user interface except the "Keywords" section is now replaced by an "Observations" section 2102. The learner can enter observations and/or notes within the "Observations" section 2102. The map can comprise the nodes and connections generated by the architect. The map can be a visual organization tool for the learner. A learner can select a node and/or a node connection, in some cases the node or node connection can be selected by clicking, hovering over, and/or touching (e.g., on a touchscreen) the node or connection. When a node or node connection is chosen it can be highlighted or shown in a different color from unselected nodes and/or node connections.

A learner may not have write access to the metadata entered by the architect that is associated with each node and/or node connection. In other words, a learner may not be able to access and modify the metadata entered by the architect (shown in FIG. 19). However, as shown in FIG. 21, the learner can have read access to the metadata indicative of the description, guiding questions, and references for each node. The keywords are hidden from the learner since they are to be identified from the learner's observations. As described elsewhere herein, the textual observations of the learner can be analyzed and compared to a list of keywords that were entered and stored in the map by the architect. The text analysis can be provided to a trainer in real time to indicate a level of understanding or characterization of perception of the learner.

A learner can select one or more nodes and/or one or more node connections to enter data (observations) pertaining to the one or more nodes and/or one or more node connections. In some cases the data can be notes that a learner is taking during a lesson, conversation, presentation, lecture, and/or seminar. The notes can comprise words, phrases, sentences, number, numerical expressions, examples, and/or links. The learner can enter data (observations) pertaining to the one or more nodes and/or one or more node connections in the "Observations" section. Alternatively, the learner can enter data (observations) pertaining to the one or more nodes and/or one or more node connections in a floating text box.

The learner can enter data (observations) pertaining to the one or more nodes and/or one or more node connections without a question or problem prompt from a trainer. The learner can enter data (observations) while taking notes during a lesson or lecture. The learner can enter data (observations) that describes a node and/or node connection. The data entered by the learner can indicate how a learner cognitively perceives one or more concepts or connections represented by the one or more nodes and/or one or more node connections.

A text analysis can be performed on text entered by one or more learners in the "Observations" section for each node and/or node connection. The text analysis can identify matches between metadata (e.g., keywords) provided by the architect and text entered by the learner. In some cases a positive match between metadata (e.g., keywords) provided by the architect and text entered by the learner can indicate that the learner correctly understands a concept represented by the node and/or node connection. In some cases, metadata can be given a prescribed weight value such that a positive match between metadata provided by the architect and text entered by the learner can be considered more or less important to assessing whether the learner correctly understands a concept represented by the node and/or node connection.

In some instances, the learner can receive feedback from the system based on matching between their text input and metadata provided by the architect. The feedback can be provided in real time. Alternatively, the feedback can be provided at predetermined intervals during the lesson, conversation, presentation, lecture, and/or seminar. The predetermined intervals can be set by a trainer during the lesson or at chosen intervals during the lesson. In some cases, feedback can be provided at the completion of the lesson, conversation, presentation, lecture, and/or seminar. As shown in FIG. 20, a feedback button 2002, a progress bar 2004, and an alignment score 2006 can be provided in the map rendered to the learner. When a user clicks on the feedback button 2002, the progress bar 2004 and the alignment score 2006 can be updated in real-time. In some cases, the progress bar 2004 and the alignment score 2006 can be updated at predetermined intervals during a lesson. The level of understanding of the learner can be displayed visually with shapes, colors, numerical values, and/or patterns that correspond to different levels of understanding. Levels of understanding can be correlated with an alignment score such that a low alignment score indicates a low level of understanding (e.g., fewer keywords identified from the learner's observations) and a high alignment score indicates a high level of understanding (e.g., greater number of keywords identified from the learner's observations). The level of progress of the learner can be visually depicted on the progress bar 2004 using different colors. In FIG. 20, an alignment score of 15/24 indicates that the learner has successfully identified 15 keywords out of a total of 24 keywords in his/her observations associated with the nodes "number," "operations," expressions," and equation."

Accordingly, the system described above can assess a level of understanding of one or more learners during a lesson, conversation, presentation, lecture, and/or seminar in real time. The system can assess the overall level of understanding of a group of learners and/or the level of understanding of an individual learner.

The level of understanding of one or more learners can be represented by the alignment score. The alignment score can represent an average of how well the text entered by the learner matches the metadata words and phrases provided by the architect or trainer. In some embodiments, the alignment score can be a weighted average such that matching between a first fraction of the text entered by the learner and the metadata words and phrases provided by the architect increases the alignment score more than matching between a second fraction of the text entered by the learner and the metadata words and phrases provided by the architect. Metadata that represents relatively more important concepts can be weighted to have a higher contribution to the alignment score when a trainer's text input matches with the architect's metadata.

In some embodiments, the progress bar 2004 can be updated in real time while a learner is entering text into the map. The alignment score 2006 can also be updated in real time or at predetermined intervals to show one or more learner's level of understanding of the nodes and/or node connections provided in the map. As previously described, the level of understanding of one or more learners can be displayed visually with shapes, colors, numerical values, and/or patterns that correspond to different levels of understanding.

Figure 22:
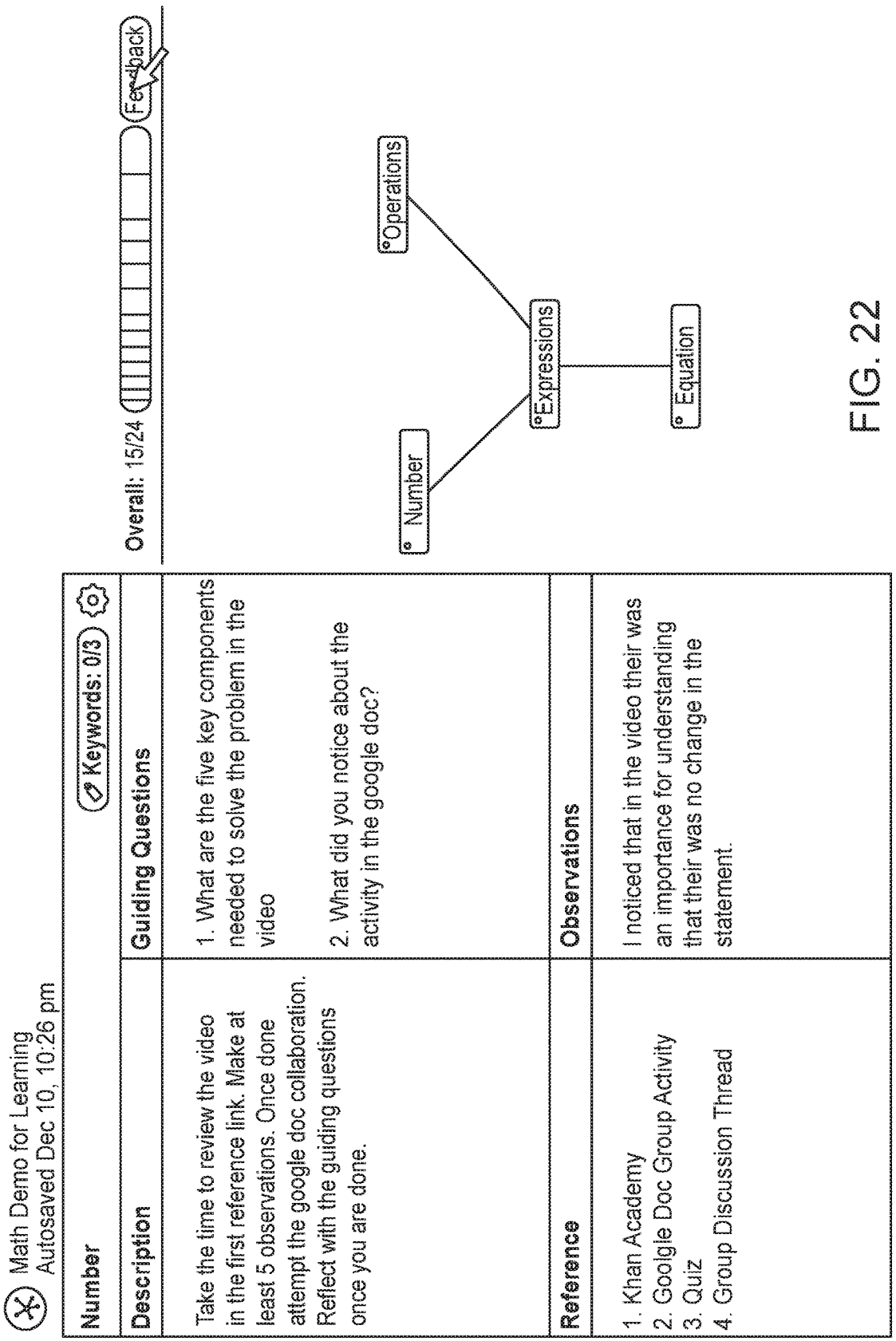
FIG. 22 shows the user interface of FIG. 21 after the learner has entered observations about the concept.

FIG. 22 shows the user interface of FIG. 21 after the learner has entered observations about a concept. In some cases, hints may be provided to the learner to aid the learner in mastering the concept. For example, as shown in FIG. 23, when the learner clicks on the word "statement" 2302, the relevant guiding question 2304 ("What are the five key components needed to solve the problem in the video?") may be highlighted to the learner. The question 2304 can serve to guide the learner's learning process such that the user can think along the lines posed by the question. As shown in FIG. 24, a message 2402 may appear to inform the learner that he/she is on the right track, and that the word "statement" is a synonym related to one of the keywords that the learner has to identify. The message 2402 may also include a link 2404 to a related reference. The learner can use the link 2404 to visit the related reference to learn more about the concept, so as to identify the remaining keywords. The related reference may be a website, a document, a video, an image, or any form of media that contains information related to the concept and/or keywords.

After the learner has visited the related reference, the learner may enter a new observation based on information obtained from the reference. For example, the learner may have entered the observation "The video called it an expression because it modeled the amount," as shown in FIG. 25. When the learner clicks on the first guiding question 2502 in FIG. 25, a message 2602 (shown in FIG. 26) may appear informing the learner that he/she has only one more keyword to be identified before satisfying the alignment requirements of the guiding question.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A system for characterizing perception of a learner, the system comprising:

an electronic display with a user interface including a map comprising (i) one or more blocks representing concepts from a common subject and (ii) one or more line segments connecting the one or more blocks, wherein each block and each line segment is associated with metadata tags stored in memory, and wherein the user interface renders a textual input region to permit a learner to enter text to describe each block and each line segment; and one or more computer processors that are programmed to (i) match the metadata tags with the text to generate an alignment score; and (ii) generate a characterization of perception of the learner based on the alignment score for display to a trainer, wherein the user interface further comprises a feedback button configured to: (1) receive a user input, and (2) update the alignment score in the user interface in response to the user input.

2. The system of claim 1, wherein the one or more blocks are organized in a visual hierarchical manner using the one or more line segments.

3. The system of claim 1, wherein the one or more line segments are indicative of the conceptual relationships between different concepts.

4. The system of claim 1, wherein the map is dynamically updated as the learner interacts with the map.

5. The system of claim 1, wherein the metadata tags comprise textual and/or visual descriptions that convey, and that can be used to assess, the learner's level of understanding of one or more concepts.

6. The system of claim 1, wherein the metadata tags comprise textual and/or visual descriptions that convey, and that can be used to assess, the learner's level of understanding of one or more connections between the concepts.

7. The system of claim 5, wherein the metadata tags comprise keywords, images, videos, values, or phrases.

8. The system of claim 6, wherein the metadata tags comprise keywords, images, videos, values, or phrases.

9. The system of claim 1, wherein the text entered by the learner comprises the learner's observations or notes pertaining to one or more concepts.

10. The system of claim 1, wherein the text entered by the learner comprises the learner's observations or notes pertaining to one or more connections between the concepts.

11. The system of claim 1, wherein the alignment score is updated in real time.

12. The system of claim 1, wherein the alignment score is updated at predetermined intervals.

13. The system of claim 1, wherein the one or more processors are programmed to generate an aggregate alignment score for at least one concept.

14. The system of claim 1, wherein the one or more processors are programmed to generate an aggregate alignment score for at least one group of learners.

15. The system of claim 1, wherein the alignment score is depicted graphically in the user interface as a function of time.

16. The system of claim 15, wherein the one or more processors are programmed to calculate the alignment score for one or more learners at one or more predetermined time stamps.

17. The system of claim 16, wherein the predetermined time stamps are at regular intervals or irregular intervals.

18. A computer-implemented method for characterizing perception of a learner, comprising:
providing a user interface to an electronic display associated with the learner, wherein the user interface comprises a feedback button and a map that comprises (i) one or more blocks representing concepts from a common subject and (ii) one or more line segments connecting the one or more blocks, wherein each block and each line segment is associated with metadata tags stored in memory, and wherein the user interface renders a textual input region to permit the learner to enter text to describe each block and each line segment;
matching the metadata tags with the text to generate an alignment score; and
generating a characterization of perception of the learner based on the alignment score for display to a trainer,
wherein the feedback button is configured to: (1) receive a user input, and (2) update the alignment score in the user interface in response to the user input.

19. A non-transitory tangible computer readable medium storing instructions that, when executed by one or more servers, causes the one or more servers to perform a computer-implemented method for characterizing perception of a learner, the method comprising:
providing a user interface to an electronic display associated with the learner, wherein the user interface comprises a feedback button and a map that comprises (i) one or more blocks representing concepts from a common subject and (ii) one or more line segments connecting the one or more blocks, wherein each block and each line segment is associated with metadata tags stored in memory, and wherein the user interface renders a textual input region to permit the learner to enter text to describe each block and each line segment;
matching the metadata tags with the text to generate an alignment score; and
generating a characterization of perception of the learner based on the alignment score for display to a trainer,
wherein the feedback button is configured to: (1) receive a user input, and (2) update the alignment score in the user interface in response to the user input.

* * * * *